US011249625B2

(12) United States Patent
Miyazaki et al.

(10) Patent No.: US 11,249,625 B2
(45) Date of Patent: Feb. 15, 2022

(54) INFORMATION PROCESSING APPARATUS, INFORMATION PROCESSING METHOD, AND COMPUTER PROGRAM PRODUCT FOR DISPLAYING DIFFERENT ITEMS TO BE PROCESSED ACCORDING TO DIFFERENT AREAS ON A DISPLAY IN A LOCKED STATE

(75) Inventors: Reiko Miyazaki, Tokyo (JP); SONY CORPORATION, Tokyo (JP)

(73) Assignee: SONY CORPORATION, Tokyo (JP)

( * ) Notice: Subject to any disclaimer, the term of this patent is extended or adjusted under 35 U.S.C. 154(b) by 379 days.

(21) Appl. No.: 14/124,023

(22) PCT Filed: Jul. 6, 2012

(86) PCT No.: PCT/JP2012/004409
§ 371 (c)(1),
(2), (4) Date: Dec. 5, 2013

(87) PCT Pub. No.: WO2013/011651
PCT Pub. Date: Jan. 24, 2013

(65) Prior Publication Data
US 2014/0109024 A1    Apr. 17, 2014

(30) Foreign Application Priority Data
Jul. 15, 2011   (JP) .............................. JP2011-156530

(51) Int. Cl.
*G06F 3/01*        (2006.01)
*G06F 3/0488*    (2013.01)
(Continued)

(52) U.S. Cl.
CPC .......... *G06F 3/04845* (2013.01); *G06F 3/017* (2013.01); *G06F 3/0482* (2013.01);
(Continued)

(58) Field of Classification Search
CPC .. G06F 3/04883; G06F 3/017; G06F 3/04845; G06F 3/04817; G06F 3/0482;
(Continued)

(56) References Cited

U.S. PATENT DOCUMENTS

2002/0021278 A1    2/2002   Hinckley et al.
2006/0019724 A1    1/2006   Bahl et al.
(Continued)

FOREIGN PATENT DOCUMENTS

CN    101132459 A    2/2009
CN    101369210 A    2/2009
(Continued)

OTHER PUBLICATIONS

Extended European Search Report dated Mar. 24, 2015 in Patent Application No. 12814901.0.
(Continued)

*Primary Examiner* — Adam M Queler
*Assistant Examiner* — Pritisha N Parbadia
(74) *Attorney, Agent, or Firm* — Xsensus LLP

(57) ABSTRACT

An information processing apparatus includes a detection unit configured to detect a position of a manipulation body on a display screen and a control unit configured to, if a first manipulation on the display screen in a locked state is detected, display, on the display screen, icons to be arranged based on a reference point indicating a position of the manipulation body when the first manipulation is completed, and if a second manipulation indicating a direction from the reference point is detected, start up an application corresponding to the icon specified by the second manipulation. An associated method and computer readable storage medium are also described.

25 Claims, 23 Drawing Sheets

(51) Int. Cl.
*G06F 3/0484* (2022.01)
*G06F 3/0482* (2013.01)
*H04M 1/72469* (2021.01)
*G06F 3/0481* (2022.01)

(52) U.S. Cl.
CPC ........ *G06F 3/0488* (2013.01); *G06F 3/04817* (2013.01); *G06F 3/04883* (2013.01); *H04M 1/72469* (2021.01); *G06F 2203/04807* (2013.01)

(58) Field of Classification Search
CPC ........ G06F 3/0488; G06F 2203/04807; H04M 1/72469
USPC .......................................................... 715/863
See application file for complete search history.

(56) References Cited

U.S. PATENT DOCUMENTS

| | | | |
|---|---|---|---|
| 2007/0008300 A1* | 1/2007 | Yang .................. | G06F 3/04886 345/173 |
| 2007/0150842 A1* | 6/2007 | Chaudhri ............ | G06F 3/04883 715/863 |
| 2008/0001928 A1 | 1/2008 | Yoshida | |
| 2008/0146245 A1 | 6/2008 | Appaji | |
| 2008/0220752 A1* | 9/2008 | Forstall .................. | H04M 1/56 455/415 |
| 2008/0313538 A1 | 12/2008 | Hudson | |
| 2009/0132197 A1* | 5/2009 | Rubin ............... | H04M 1/72563 702/141 |
| 2009/0172593 A1 | 7/2009 | Geurts et al. | |
| 2009/0215497 A1 | 8/2009 | Louch | |
| 2009/0225026 A1* | 9/2009 | Sheba .................. | G06F 1/1626 345/156 |
| 2010/0001967 A1* | 1/2010 | Yoo ....................... | G06F 3/0488 345/173 |
| 2010/0023858 A1 | 1/2010 | Ryu et al. | |
| 2010/0085317 A1* | 4/2010 | Park ..................... | G06F 1/1626 345/173 |
| 2010/0122194 A1 | 5/2010 | Rogers | |
| 2010/0162182 A1* | 6/2010 | Oh ....................... | G06F 3/04883 715/863 |
| 2010/0269040 A1* | 10/2010 | Lee ..................... | G06F 3/04817 715/702 |
| 2010/0279675 A1* | 11/2010 | Slack ..................... | G06F 9/4843 455/419 |
| 2010/0306693 A1* | 12/2010 | Brinda ................. | G06F 3/04883 715/784 |
| 2011/0047510 A1 | 2/2011 | Yoon | |
| 2011/0105193 A1* | 5/2011 | Lee ...................... | G06F 3/0488 455/566 |
| 2011/0130170 A1 | 6/2011 | Han et al. | |
| 2011/0252350 A1* | 10/2011 | Chaudhri ............ | G06F 3/04817 715/769 |
| 2011/0282206 A1* | 11/2011 | Ichioka .................. | A61B 8/463 600/443 |
| 2011/0316797 A1 | 12/2011 | Johansson | |
| 2012/0046077 A1* | 2/2012 | Kim .................. | H04M 1/72577 455/566 |
| 2012/0084248 A1* | 4/2012 | Gavrilescu ........ | G06F 17/30867 706/52 |
| 2012/0113036 A1* | 5/2012 | Lee ....................... | G06F 3/0482 345/173 |
| 2012/0129572 A1* | 5/2012 | Johnstone ............... | G06F 8/656 455/552.1 |
| 2012/0154301 A1* | 6/2012 | Kang .................. | G06F 3/04886 345/173 |
| 2012/0184247 A1* | 7/2012 | Choe ...................... | H04M 1/67 455/411 |
| 2014/0066131 A1 | 3/2014 | Yoo | |

FOREIGN PATENT DOCUMENTS

| | | |
|---|---|---|
| CN | 101404687 A | 4/2009 |
| CN | 102033710 A | 4/2011 |
| EP | 1 873 621 A1 | 1/2008 |
| EP | 2 045 700 A1 | 4/2009 |
| EP | 2 105 844 A2 | 9/2009 |
| EP | 2 144 148 A2 | 1/2010 |
| JP | H07-234837 A | 9/1995 |
| JP | 2006-252322 A | 9/2006 |
| JP | 2008-102860 A | 5/2008 |
| JP | 2008-118346 A | 5/2008 |
| JP | 2010-033358 A | 2/2010 |
| JP | 2010-191676 A | 9/2010 |
| JP | 2011-13990 | 1/2011 |
| JP | 2011-013990 A | 1/2011 |
| JP | 2011-48665 | 3/2011 |
| JP | 2011-86272 | 4/2011 |
| JP | 2012-511282 A | 5/2012 |
| JP | 2013-025357 A | 2/2013 |
| TW | 200825886 A | 6/2008 |
| WO | WO 2010/040670 A2 | 4/2010 |
| WO | WO 2010/065752 A2 | 6/2010 |
| WO | WO 2012/066706 A1 | 5/2012 |

OTHER PUBLICATIONS

Partial European Search Report dated Dec. 4, 2014 in Patent Application No. 12814901.0.
"Google Docs" Wikipedia, XP055155491, Jul. 13, 2011, 9 Pages.
International Search Report and Written Opinion dated Oct. 16, 2012 in Application No. PCT/JP2012/004409.
Second Office Action dated Feb. 6, 2017, in Chinese Application No. 201210236298.7 with English translation.
Office Action dated Oct. 11, 2016, in Japanese Patent Application No. 2015-160007 (w/ English translation).
Office Action dated Aug. 1, 2016 in Chinese Patent Application No. 201210236298.7 (with English Translation).
Extended European Search Report dated Apr. 4, 2017 in Patent Application No. 16206879.5.
Office Action issued in Chinese Application No. 201210236298.7 dated Jul. 5, 2017.
Office Action issued in corresponding Japanese Application No. 2017-008137 dated Sep. 12, 2017.
European Office Action dated Nov. 21, 2017, issued in European Patent Application No. 12 814 901.0.
Brief Communication dated Nov. 19, 2018 in European Application No. 12814901.0-1231.
Communication Pursuant to Article 94(3) EPC dated Dec. 5, 2018 in European Application No. 16206879.5-1231.
Chinese Office Action dated Sep. 25, 2020, in corresponding Chinese Patent Application No. 201810213779.3.
Office Action dated May 19, 2015 in Japanese Patent Application No. 2011-156530 (with English language translation).

* cited by examiner

[Fig. 1]
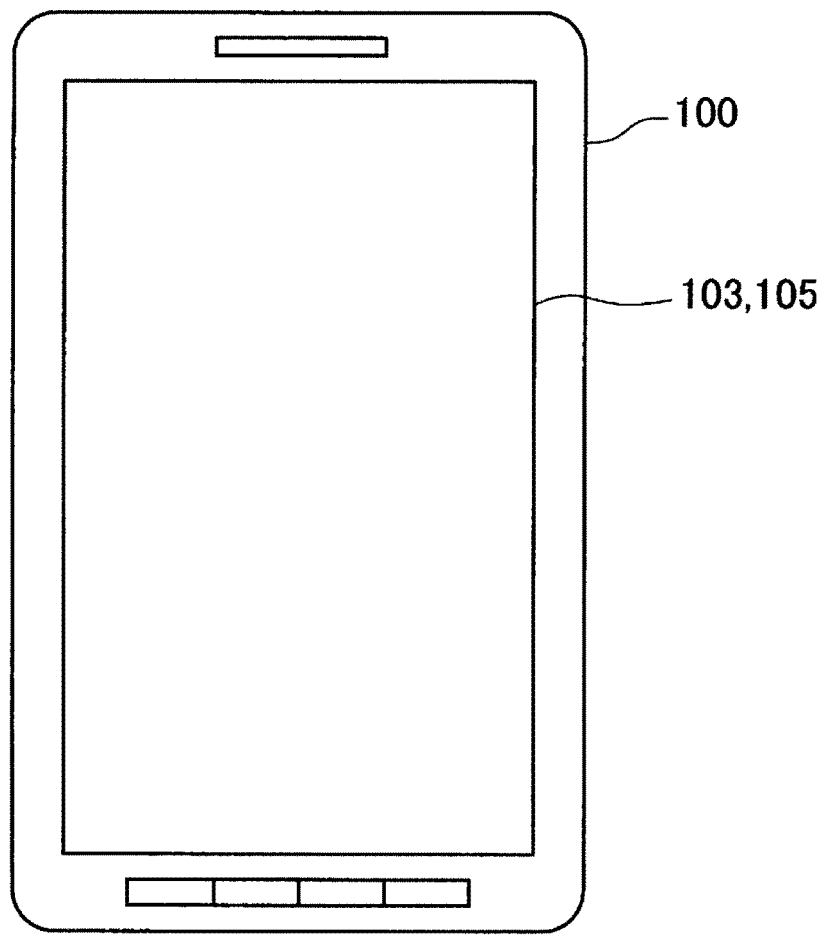
[Fig. 2]
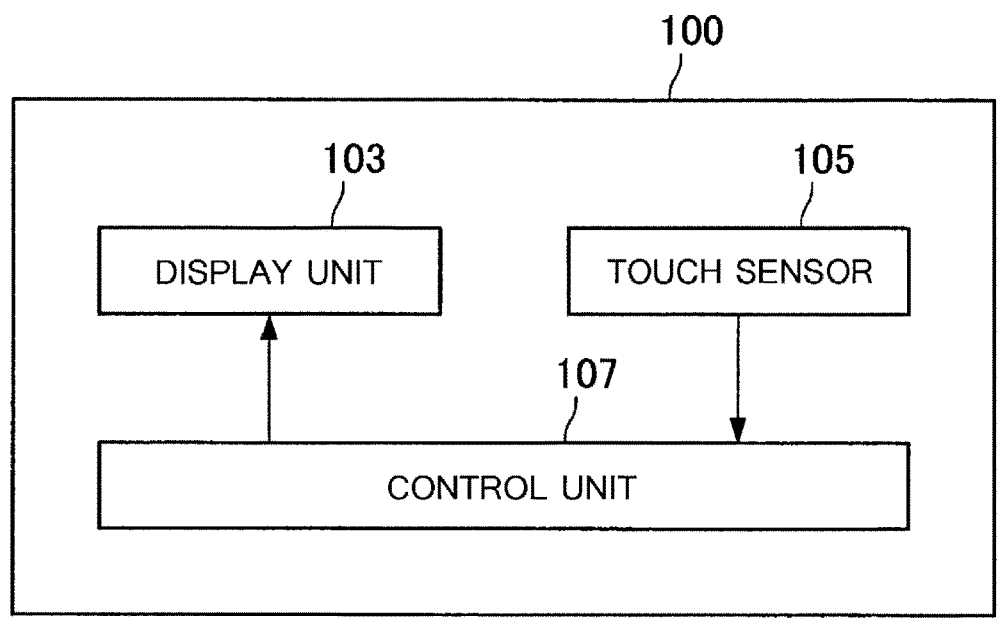

[Fig. 3]
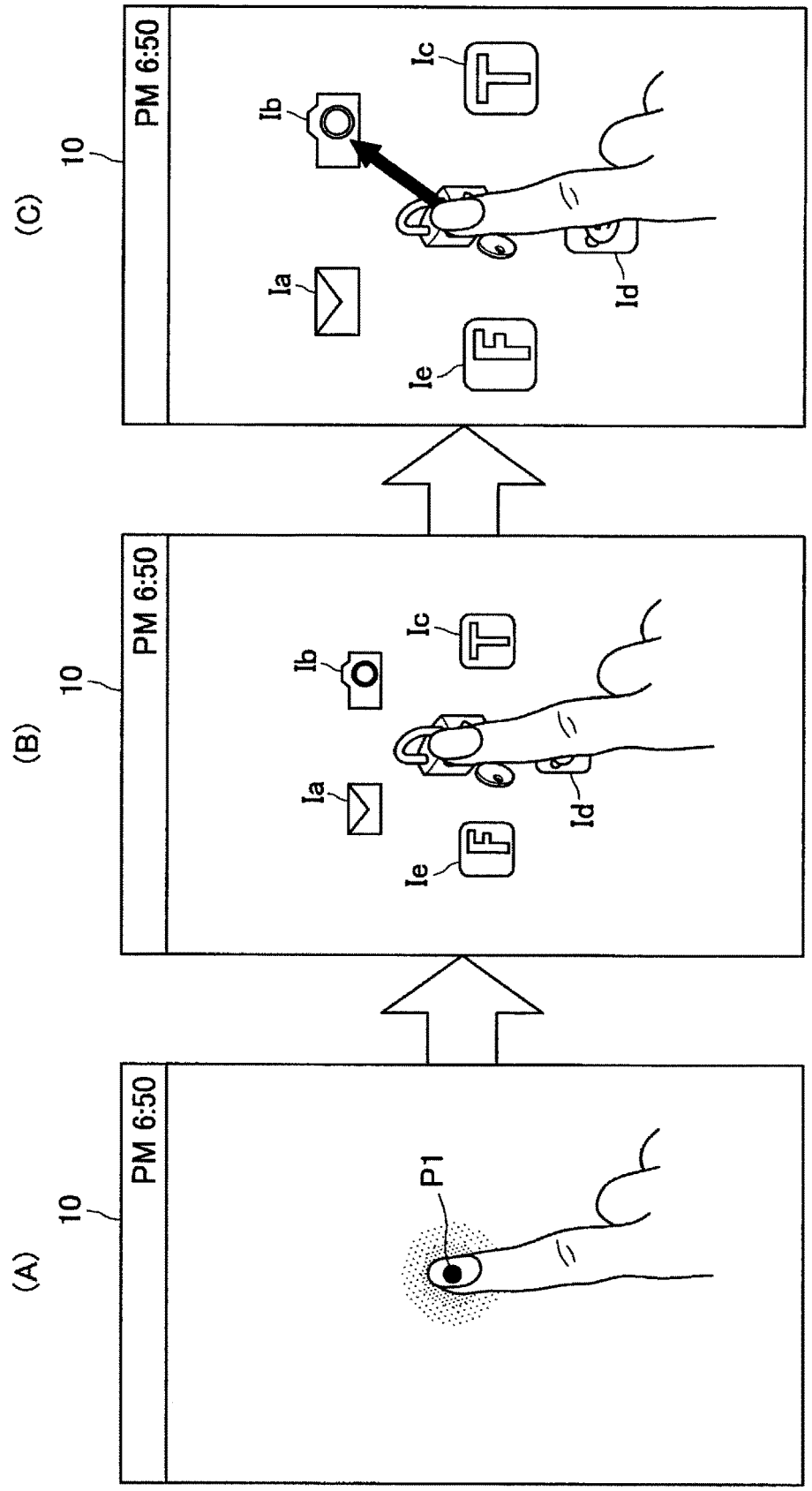

[Fig. 4]
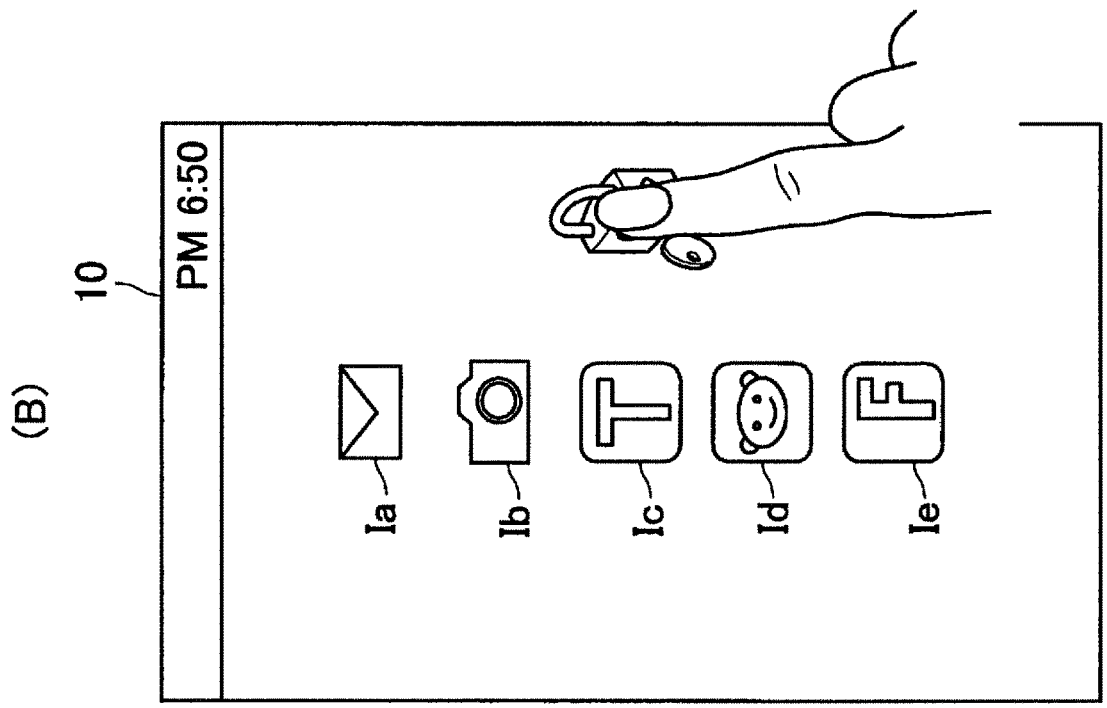
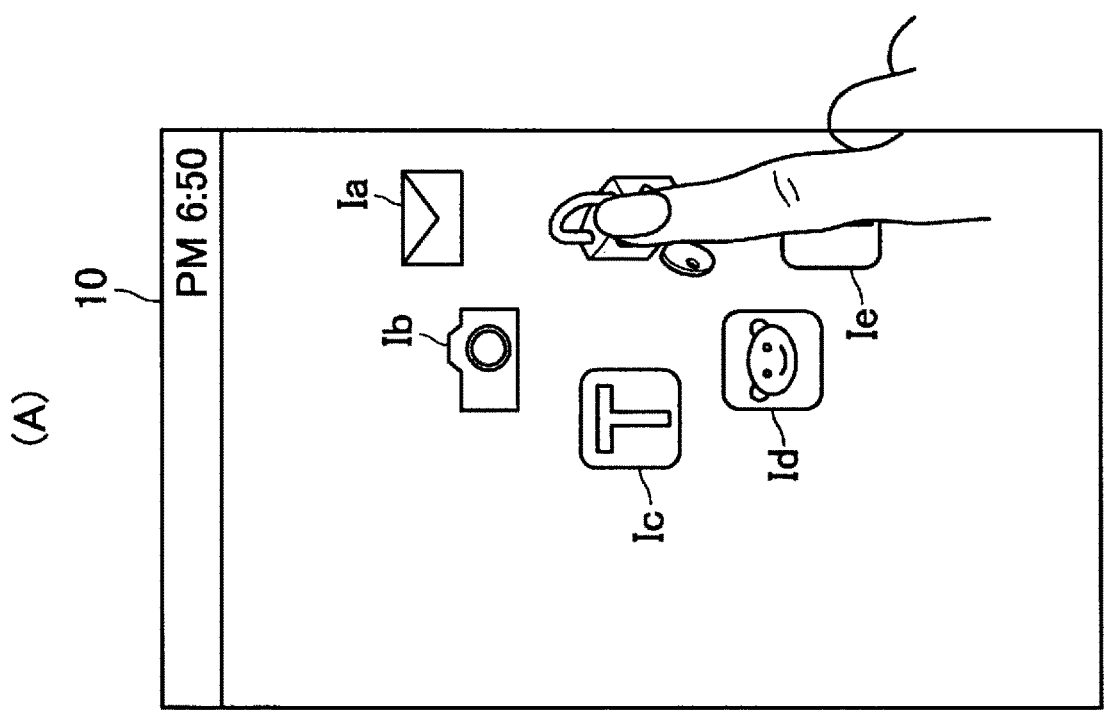

[Fig. 5]
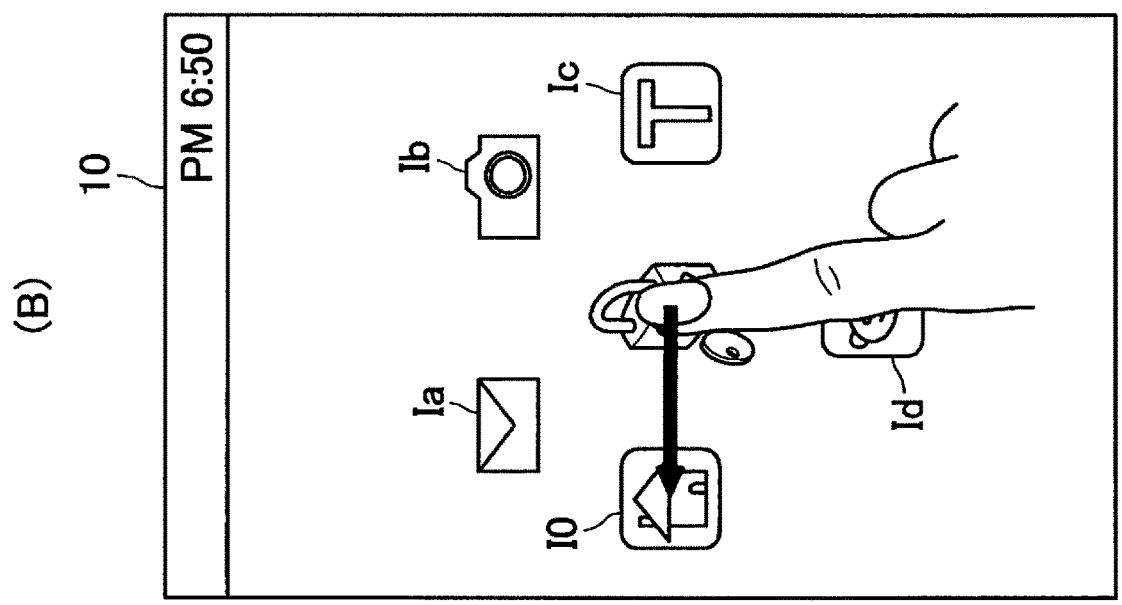
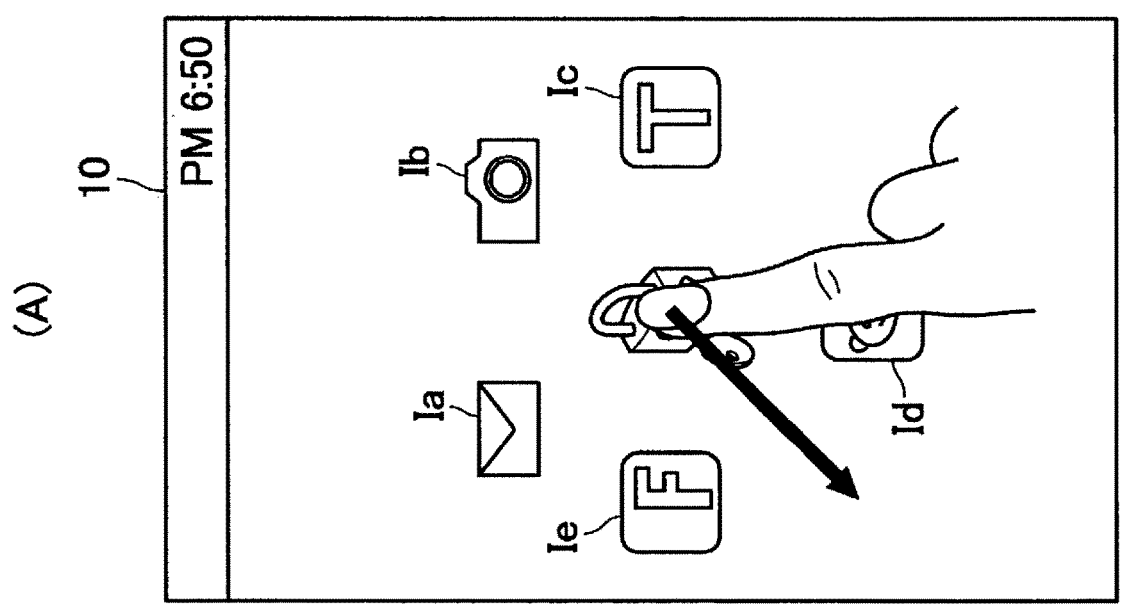

[Fig. 6]
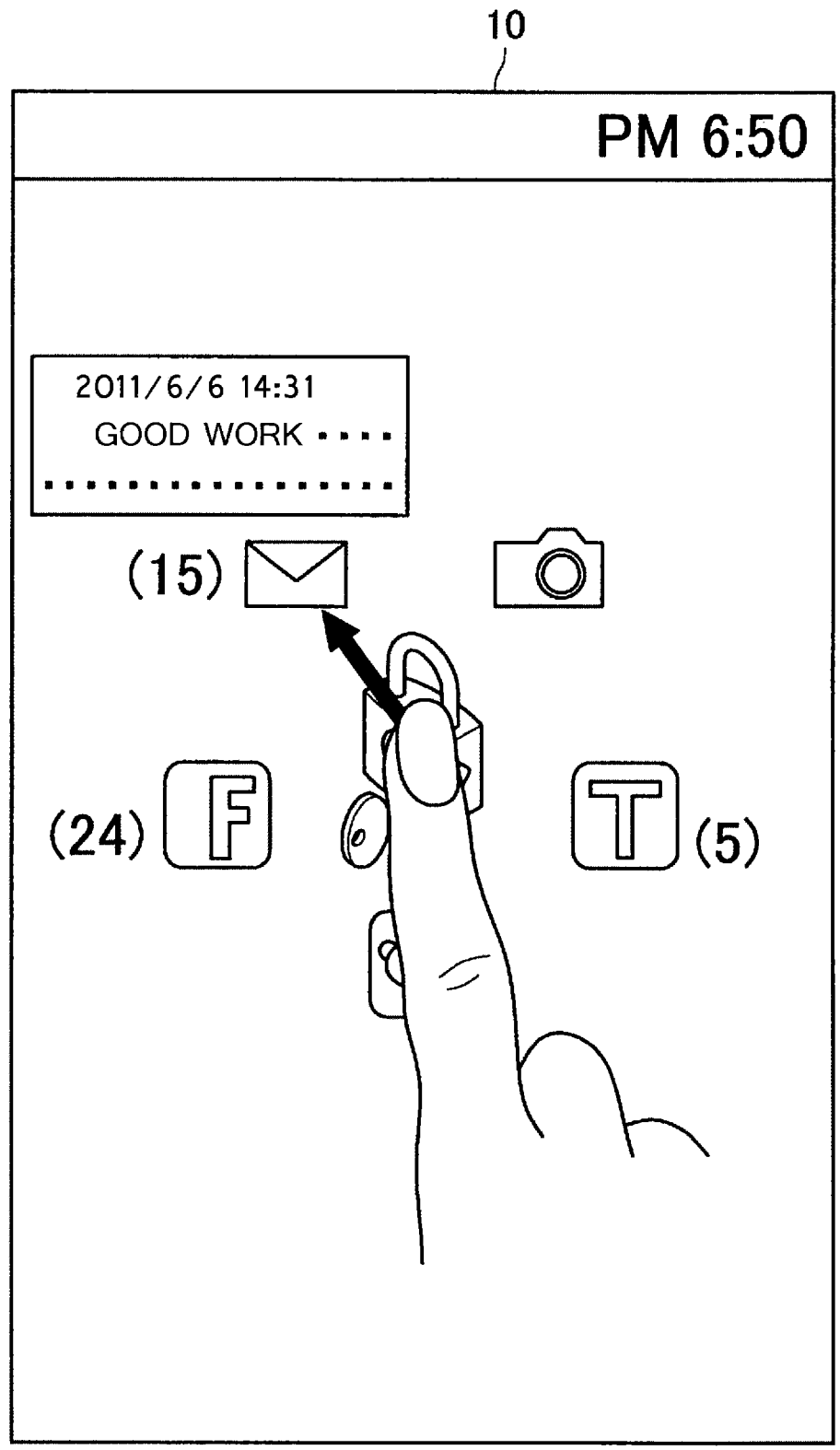

[Fig. 7]
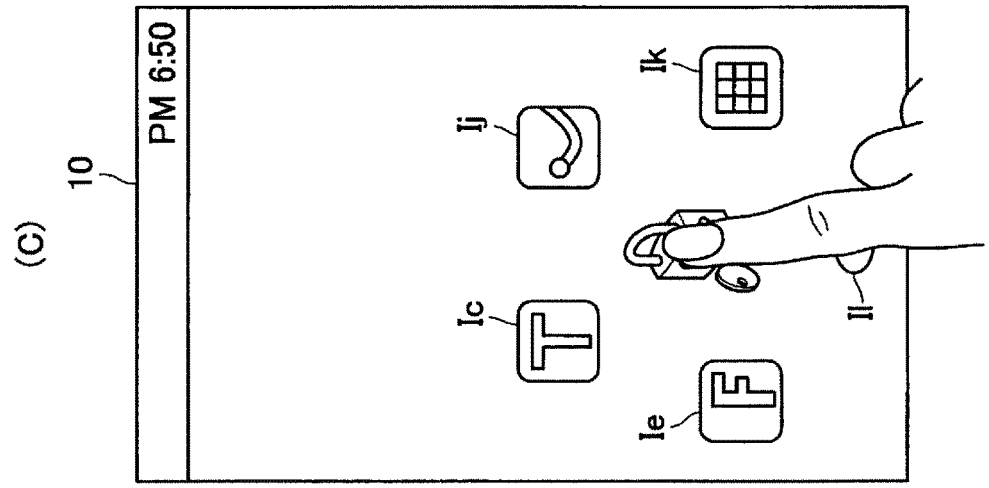
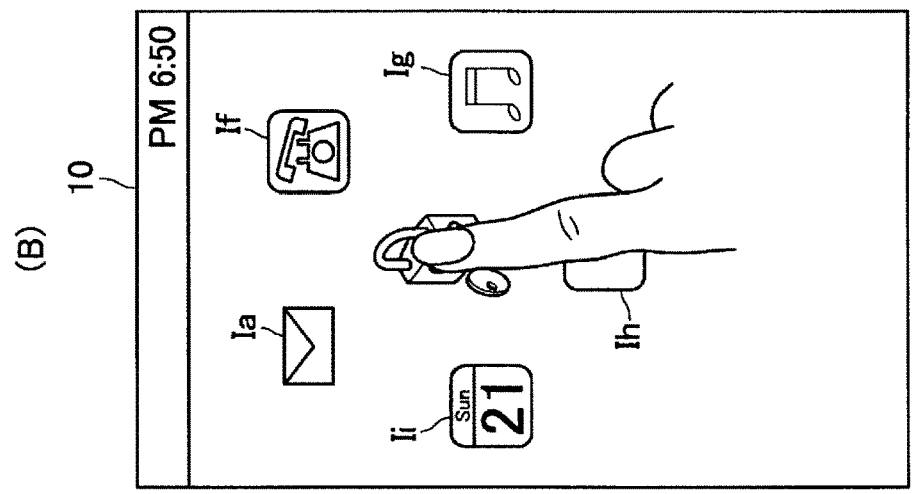
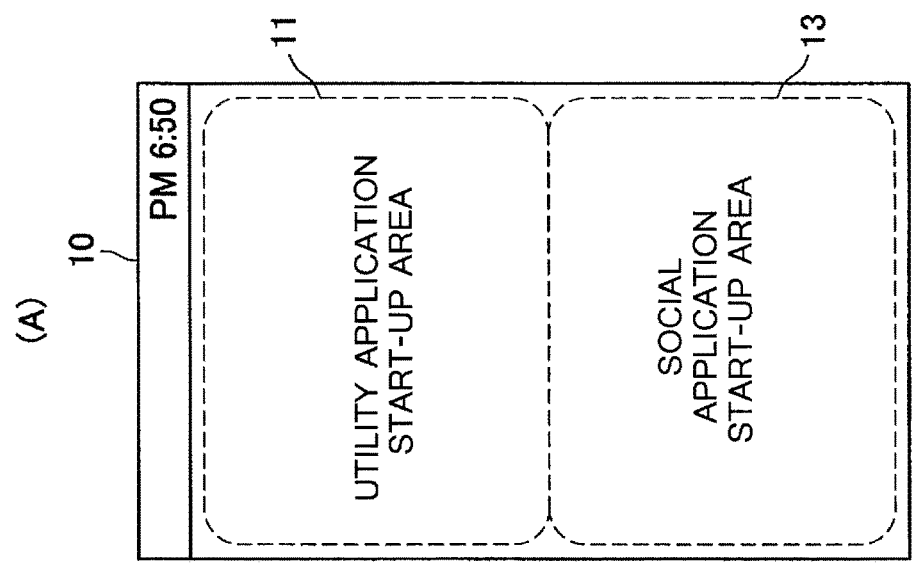

[Fig. 8]
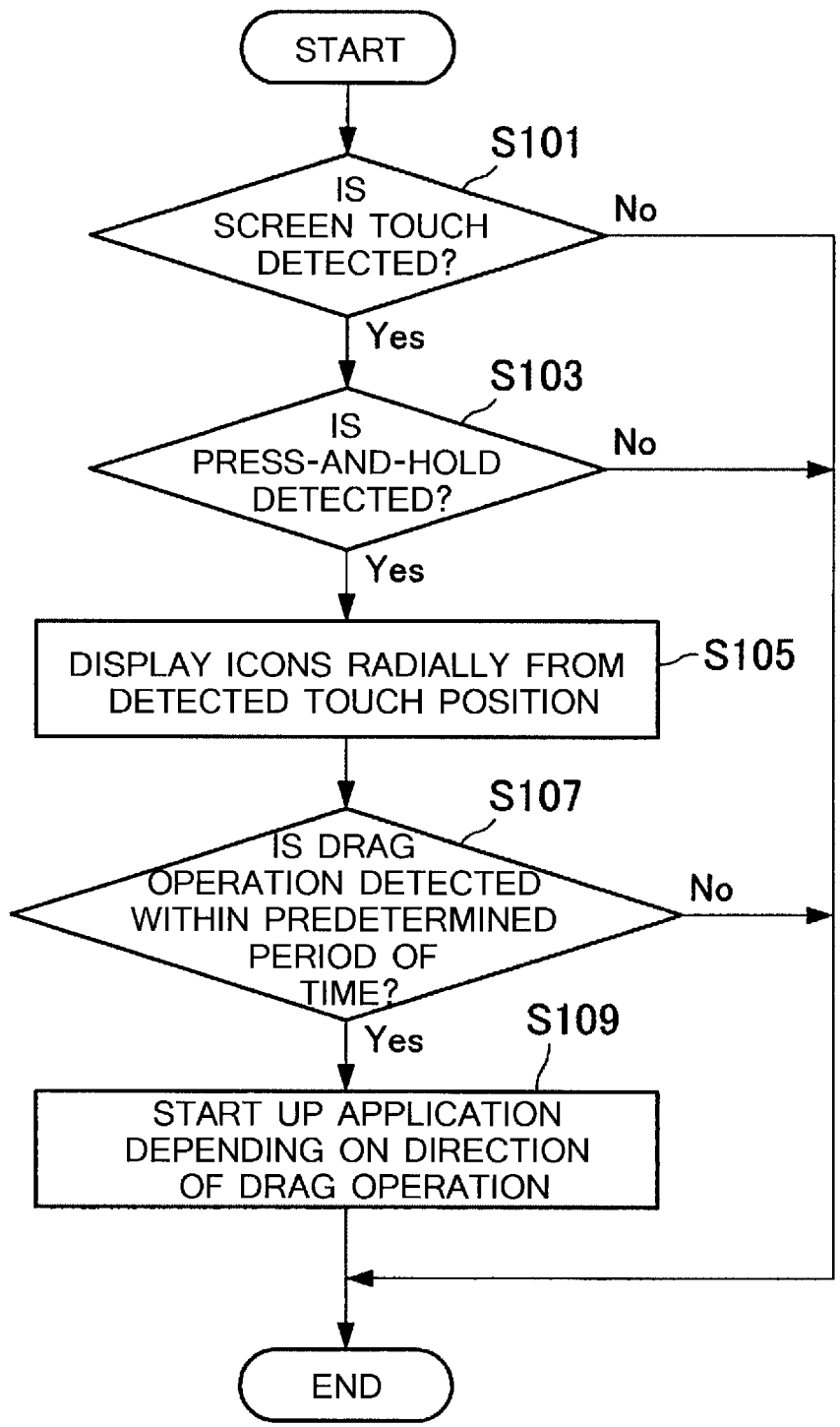

[Fig. 9]
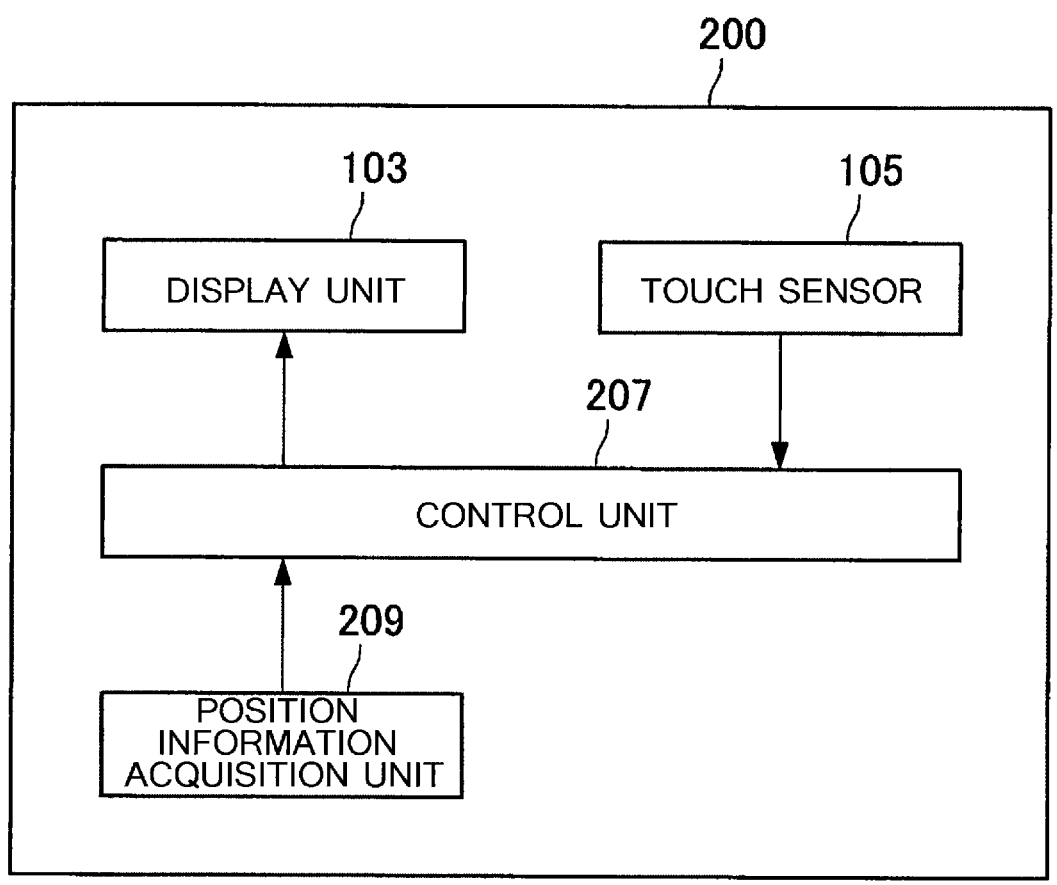

[Fig. 10]
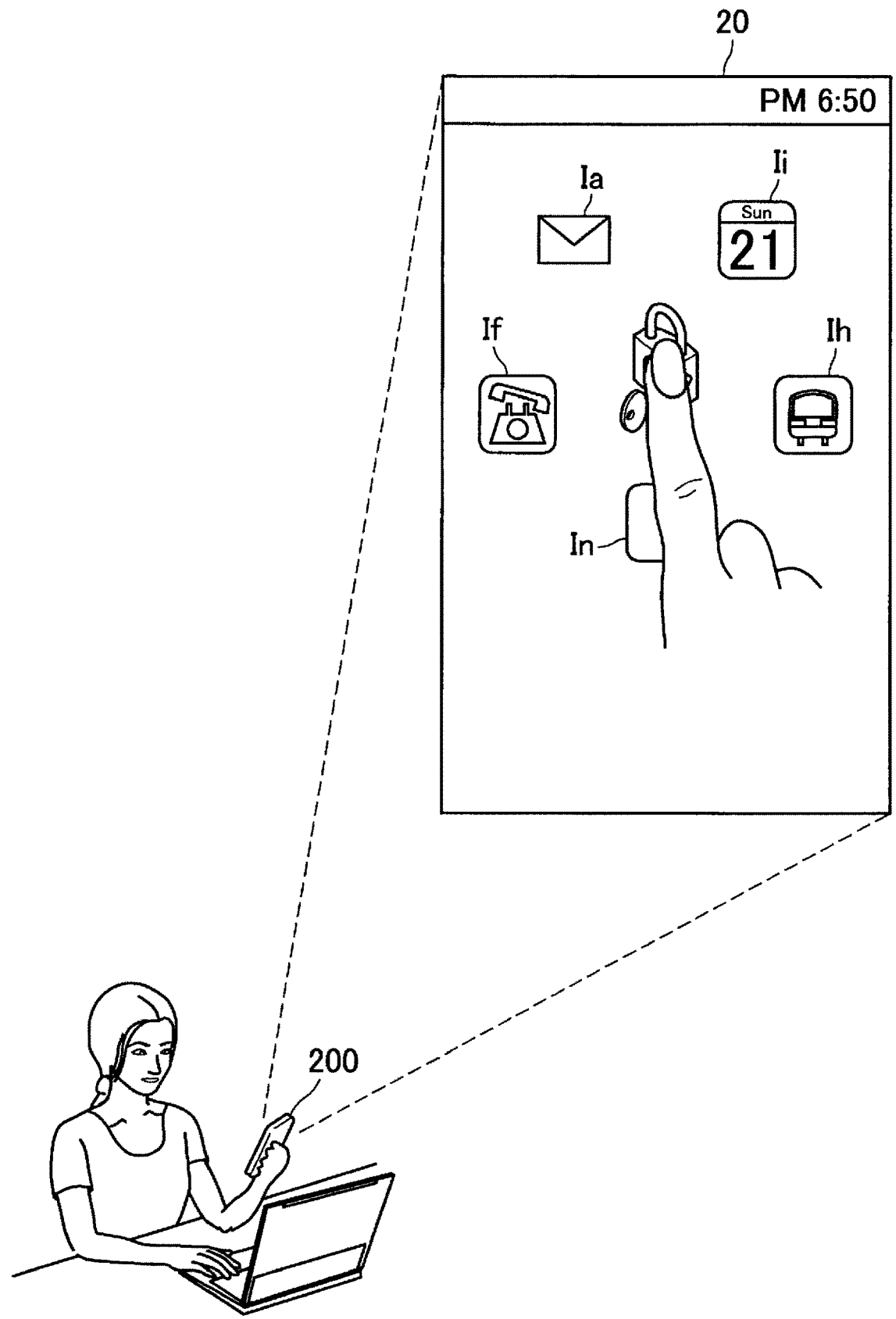

[Fig. 11]
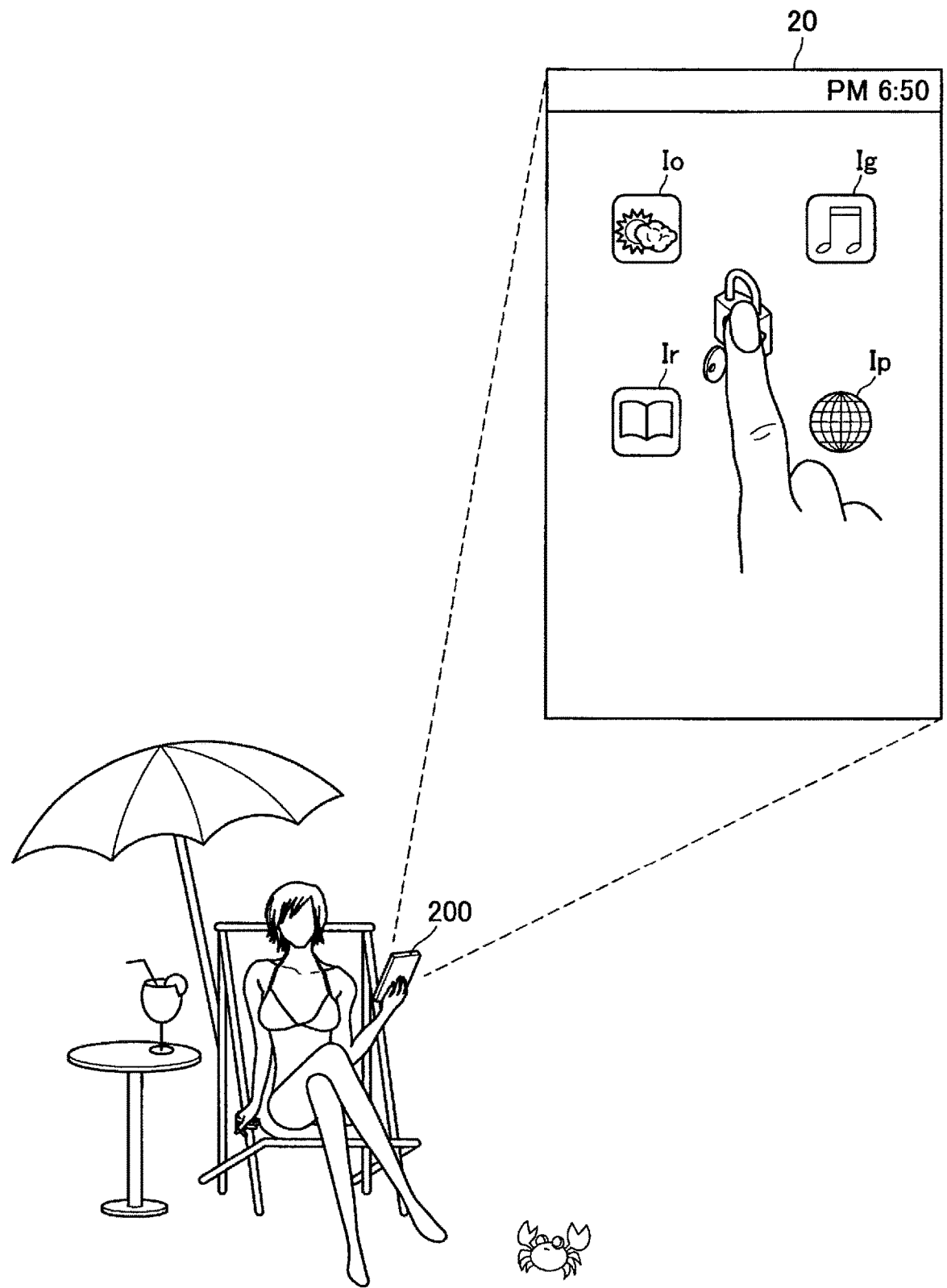

[Fig. 12]
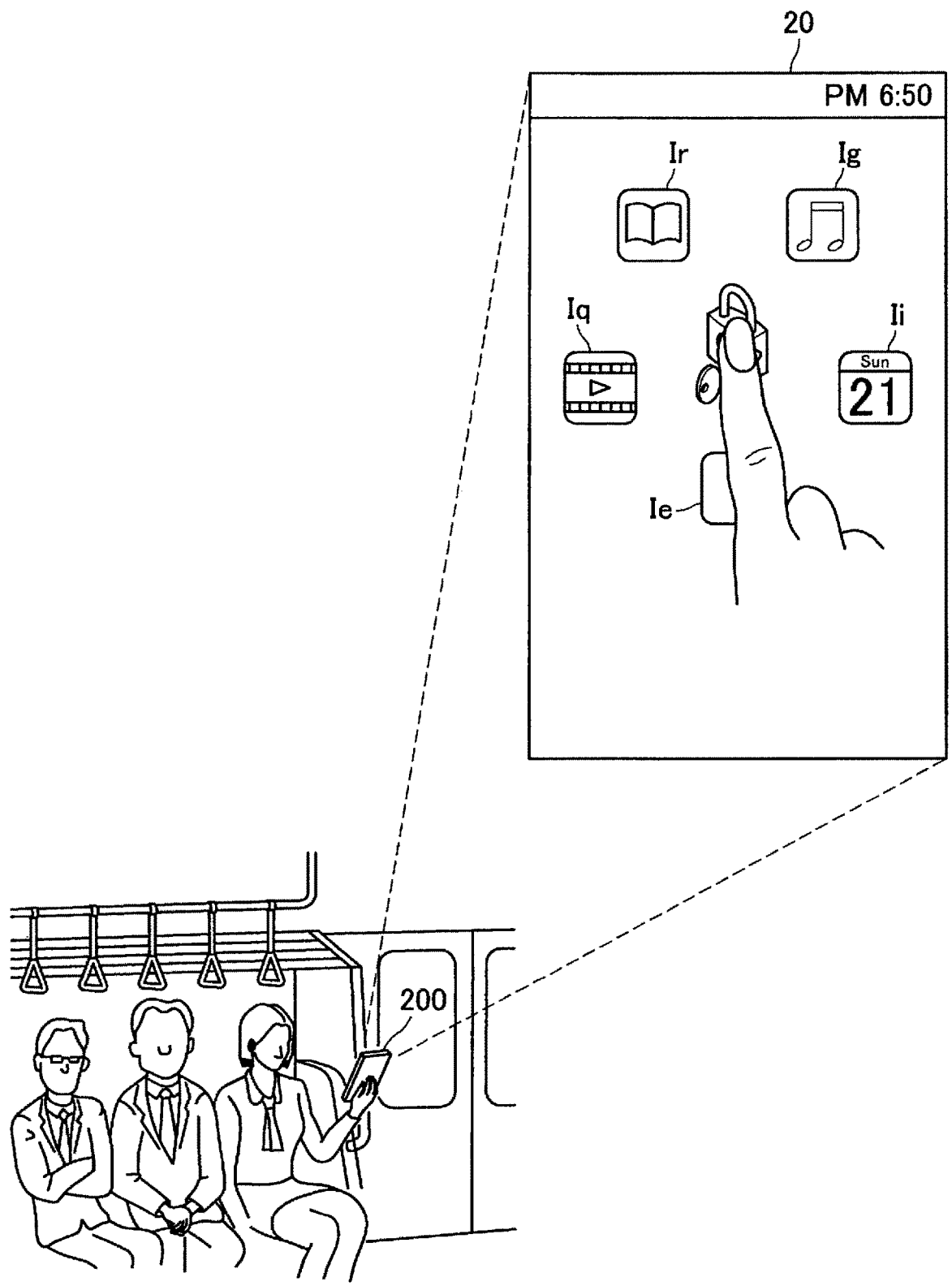

[Fig. 13]
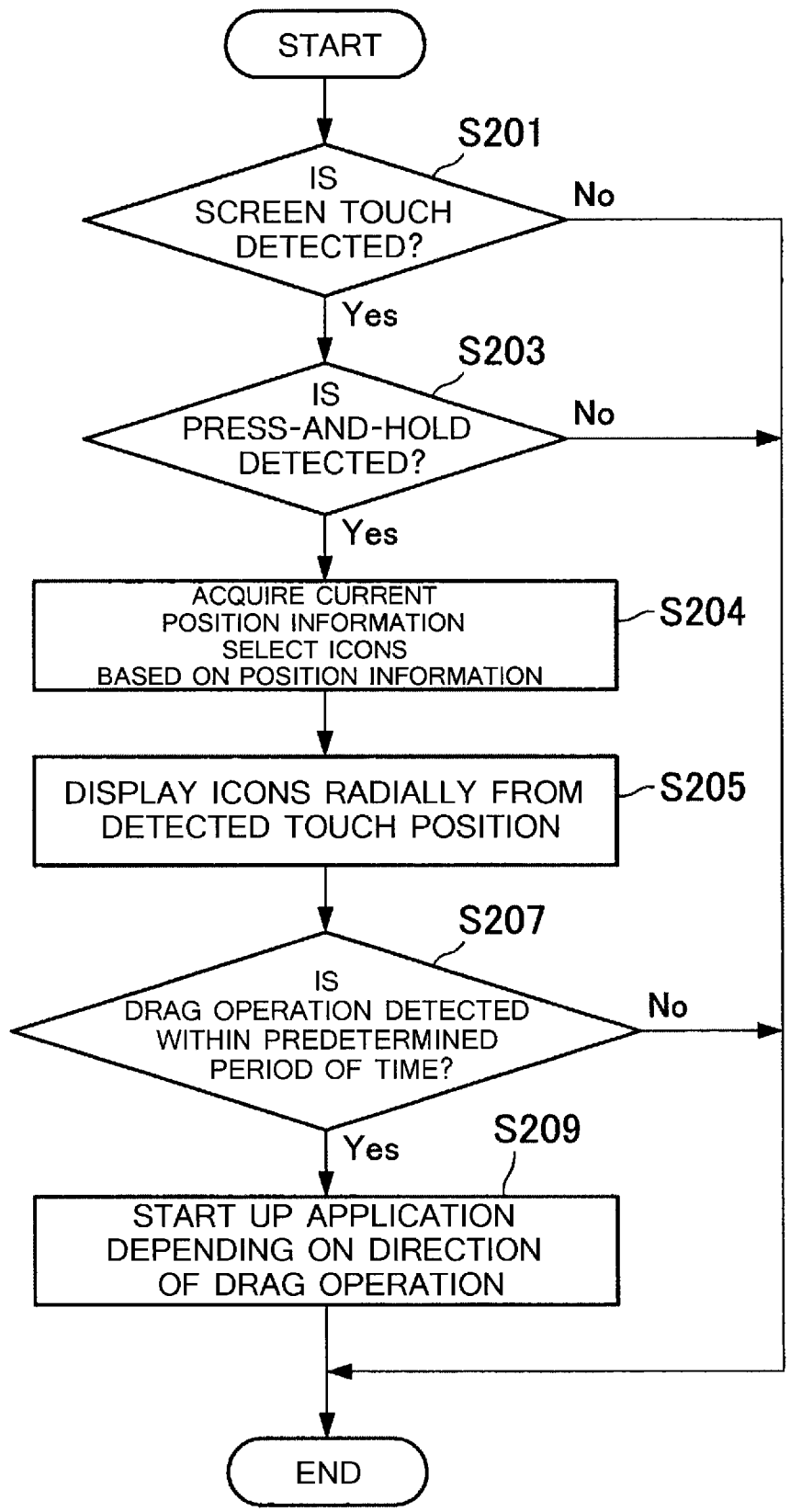

[Fig. 14]
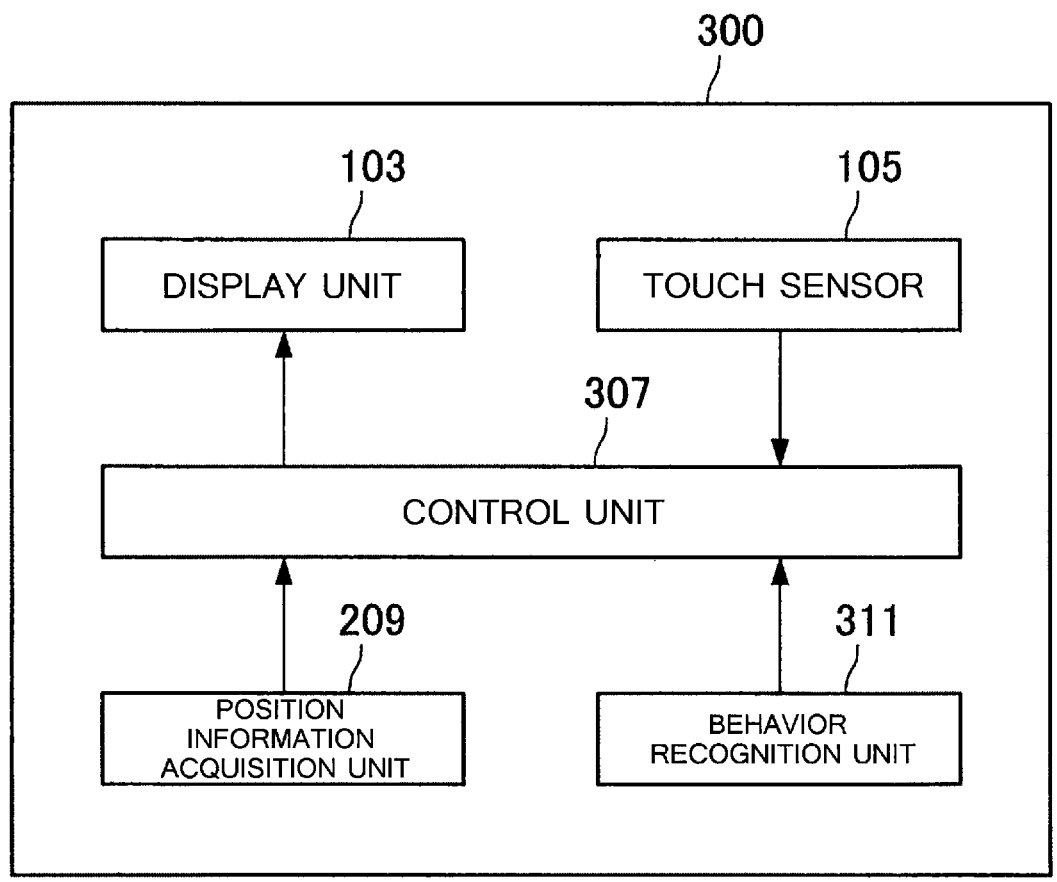

[Fig. 15]
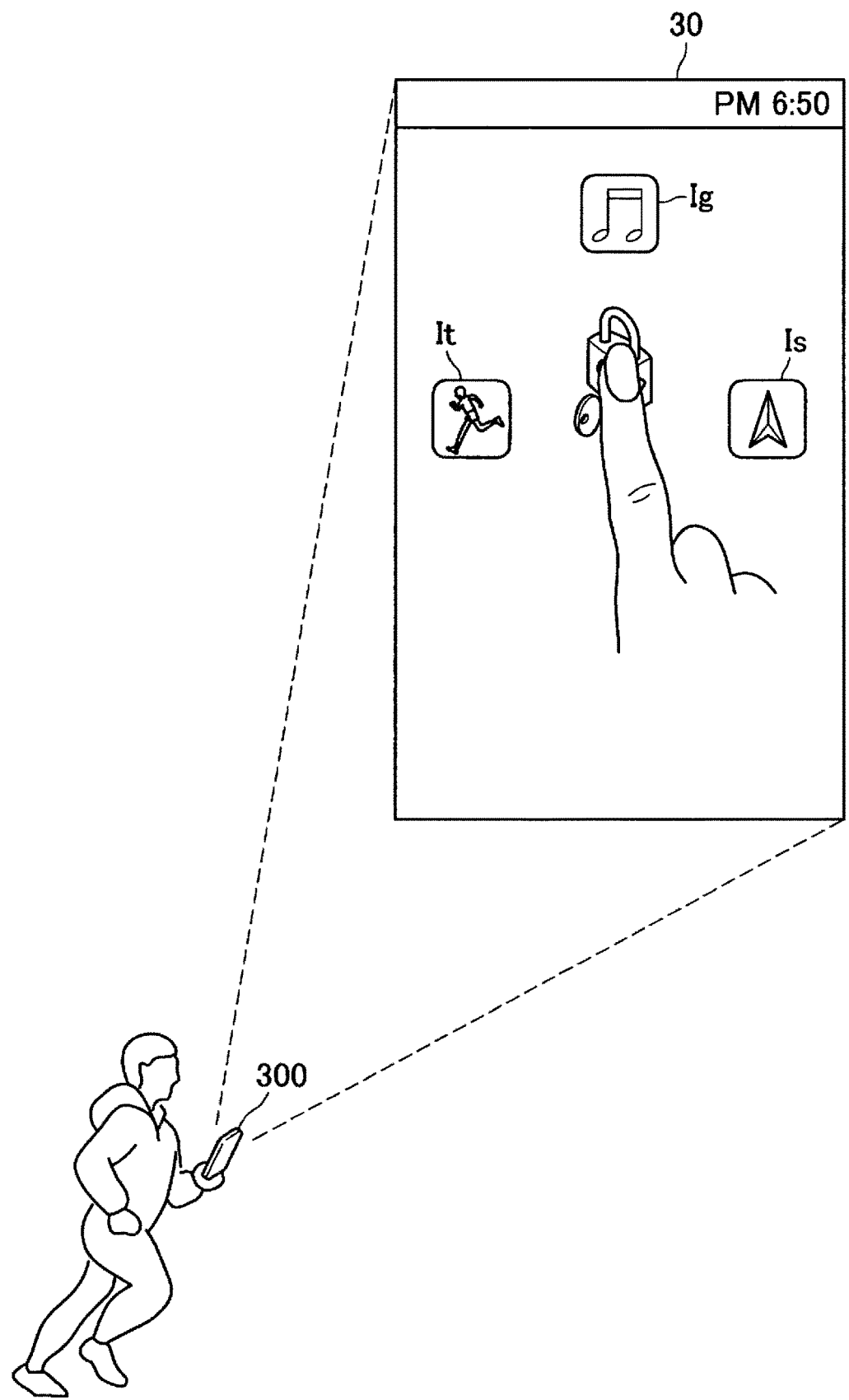

[Fig. 16]
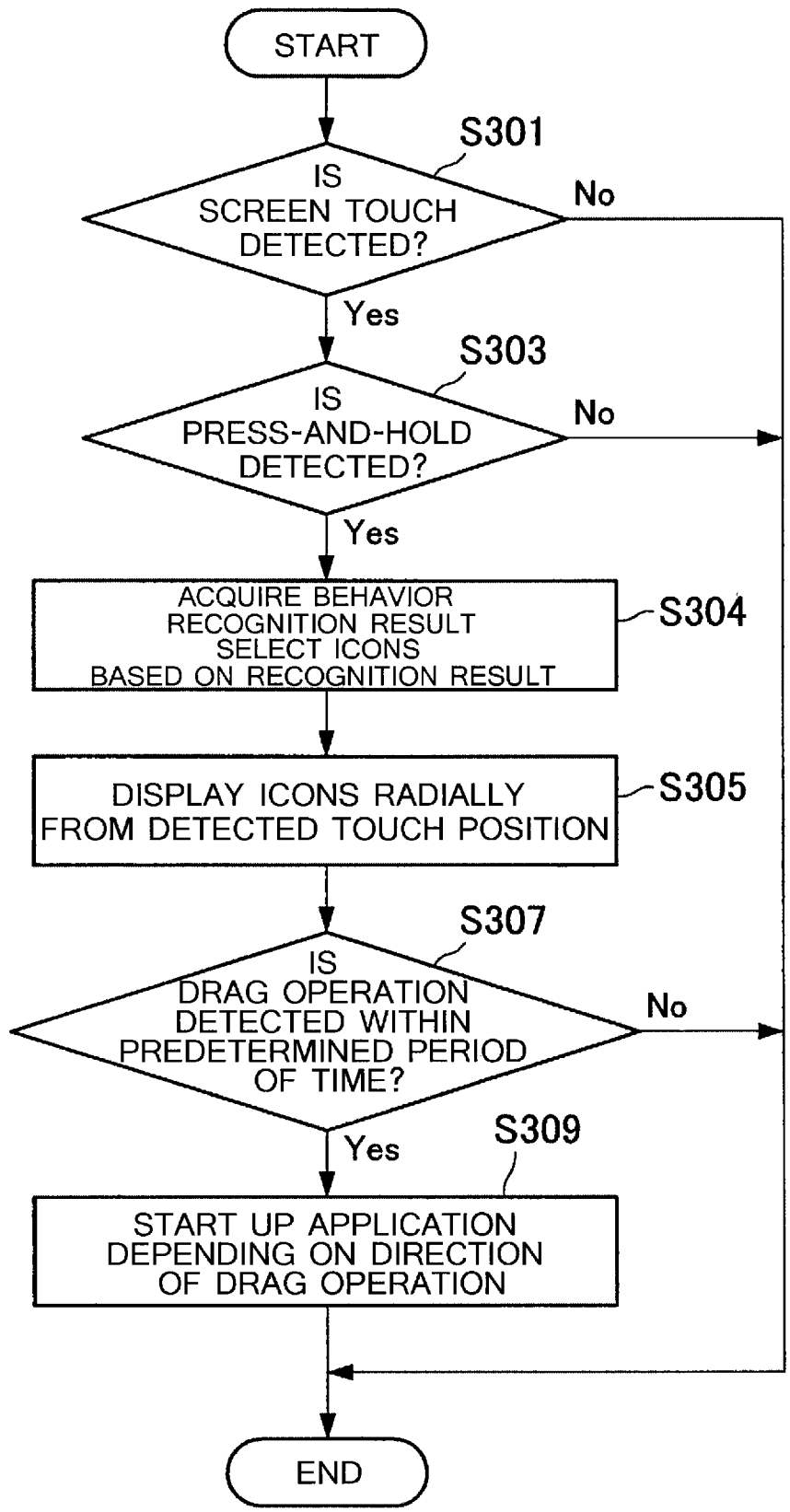

[Fig. 17]
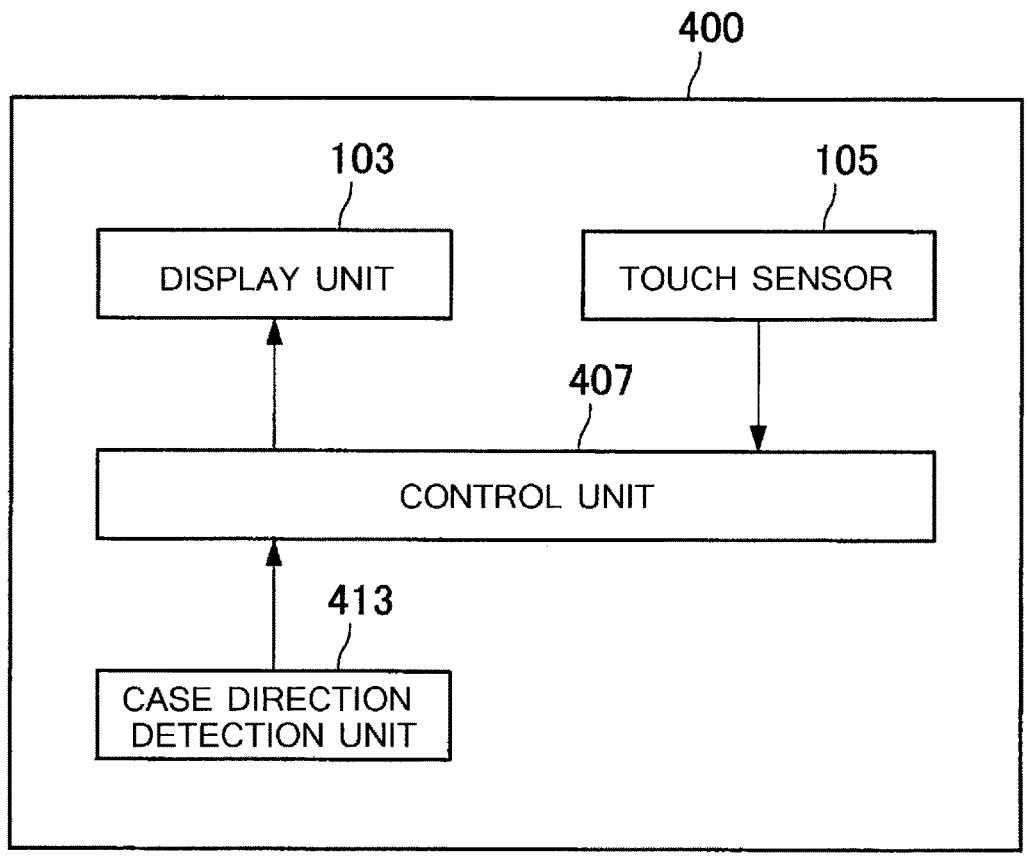
[Fig. 18]
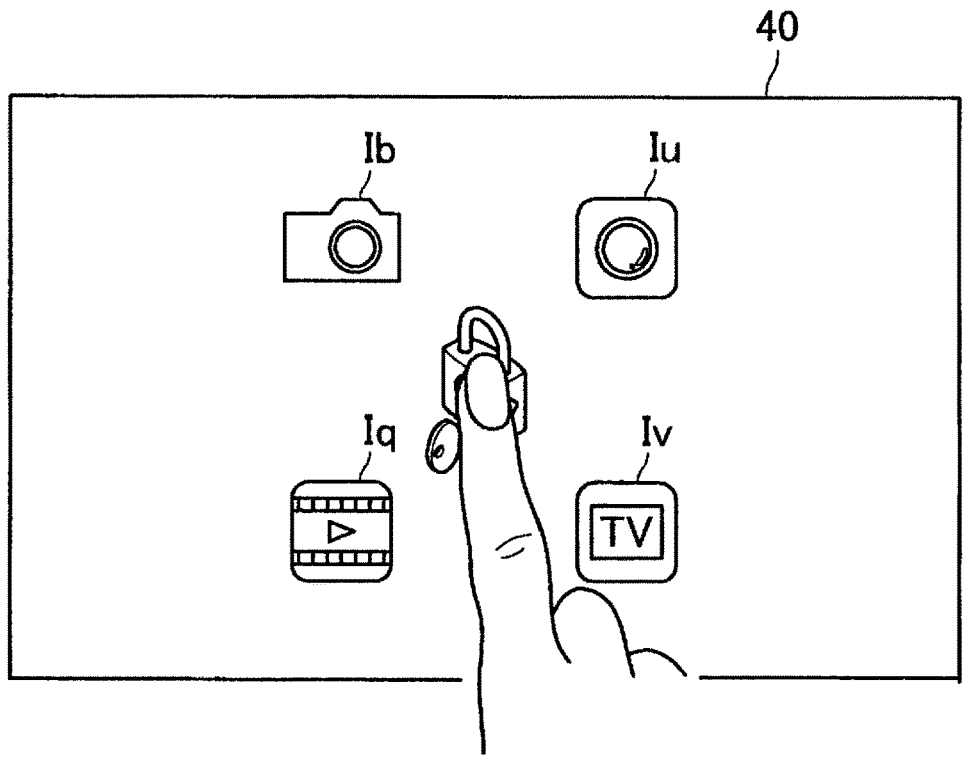

[Fig. 19]
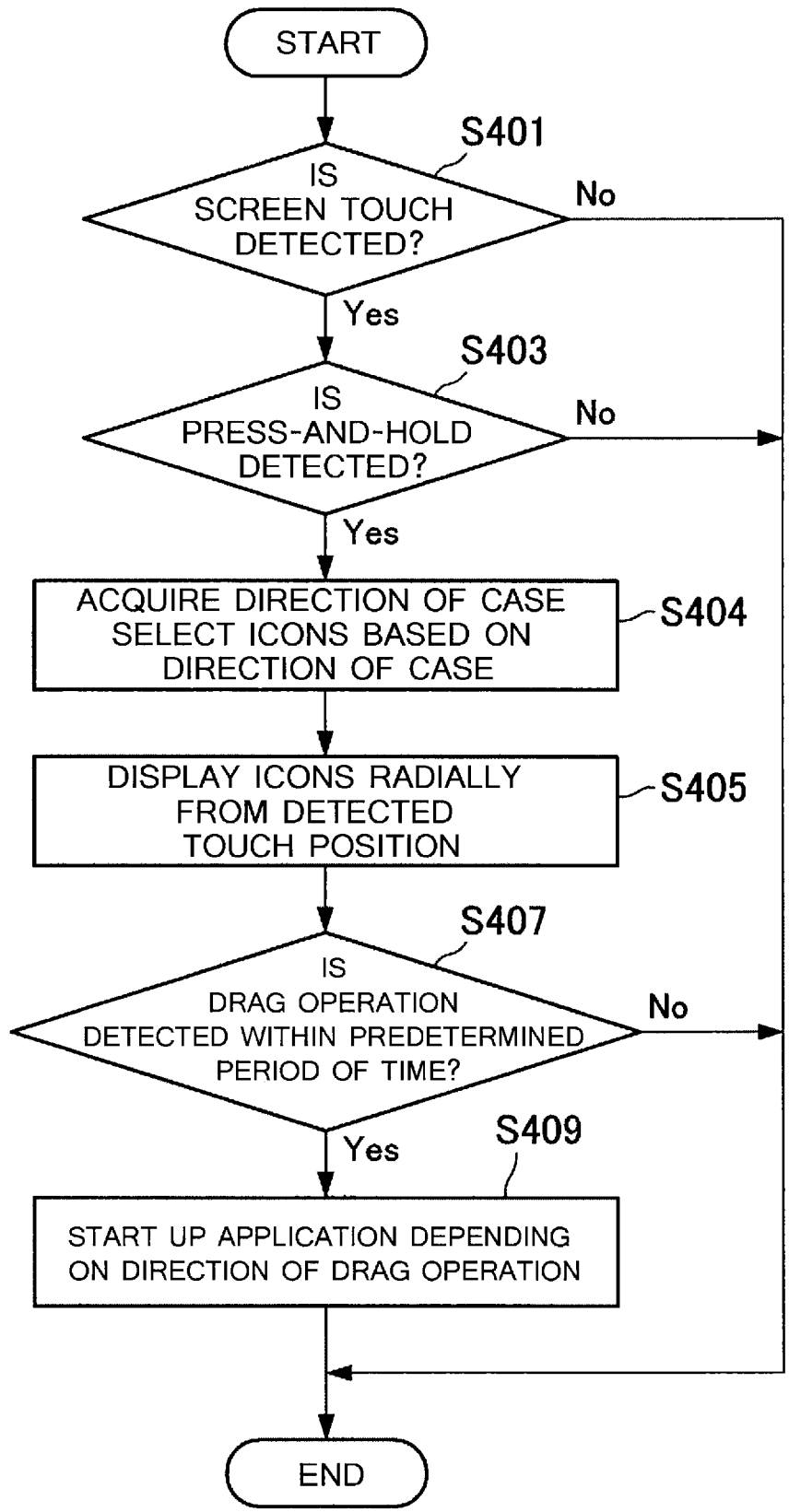

[Fig. 20]
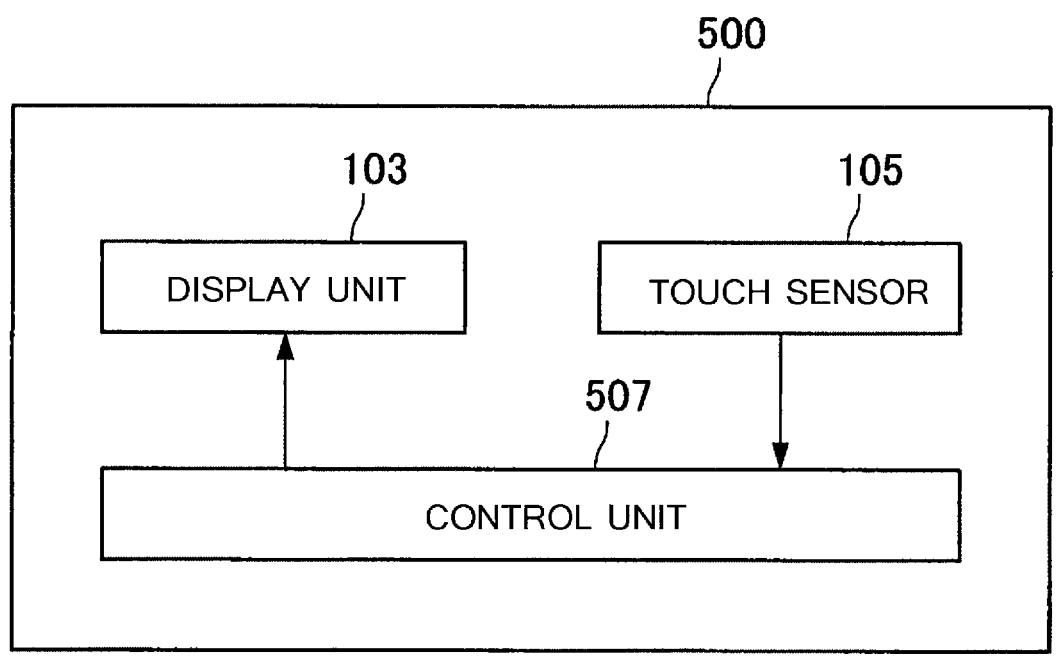

[Fig. 21]
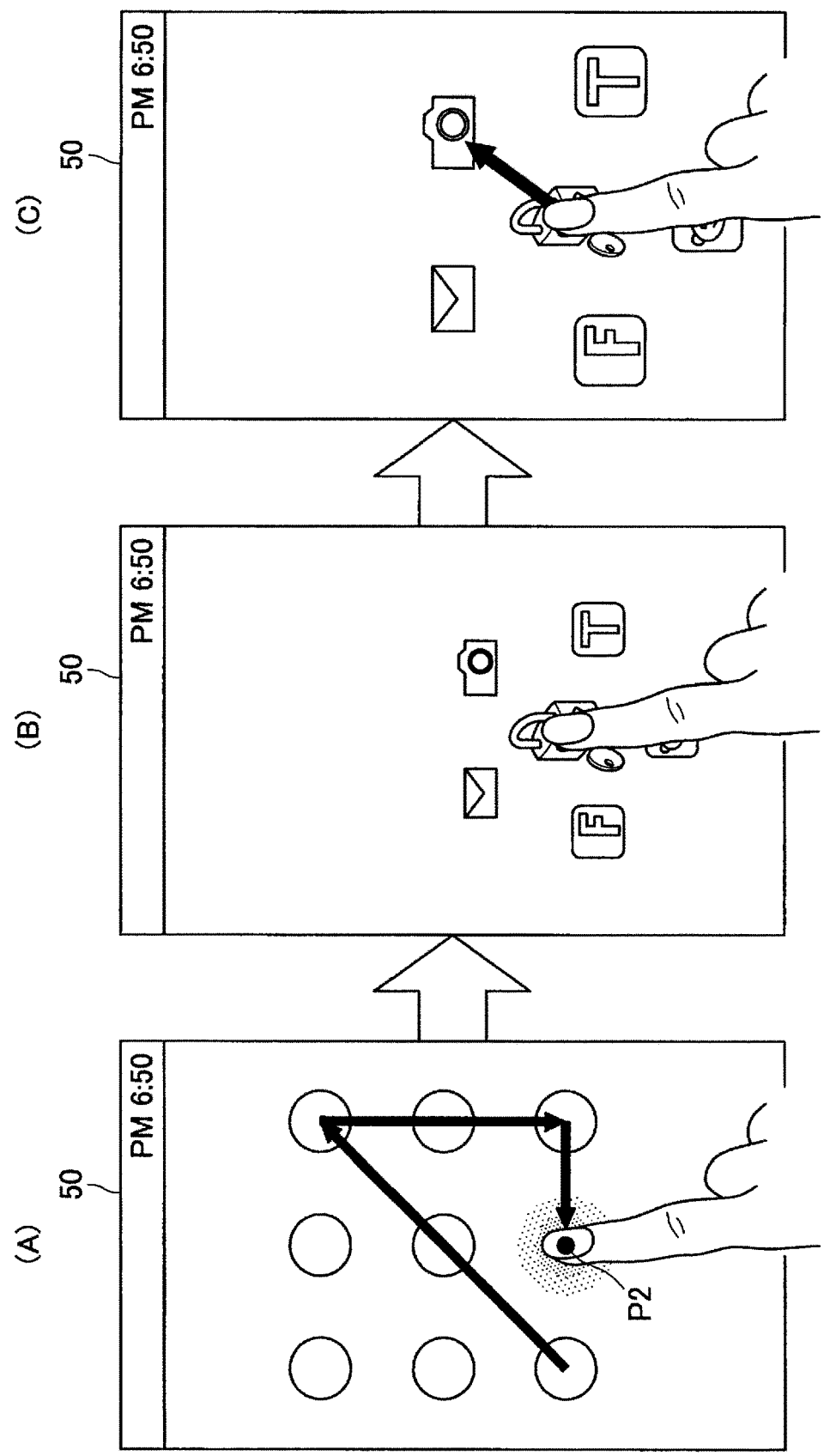

[Fig. 22]
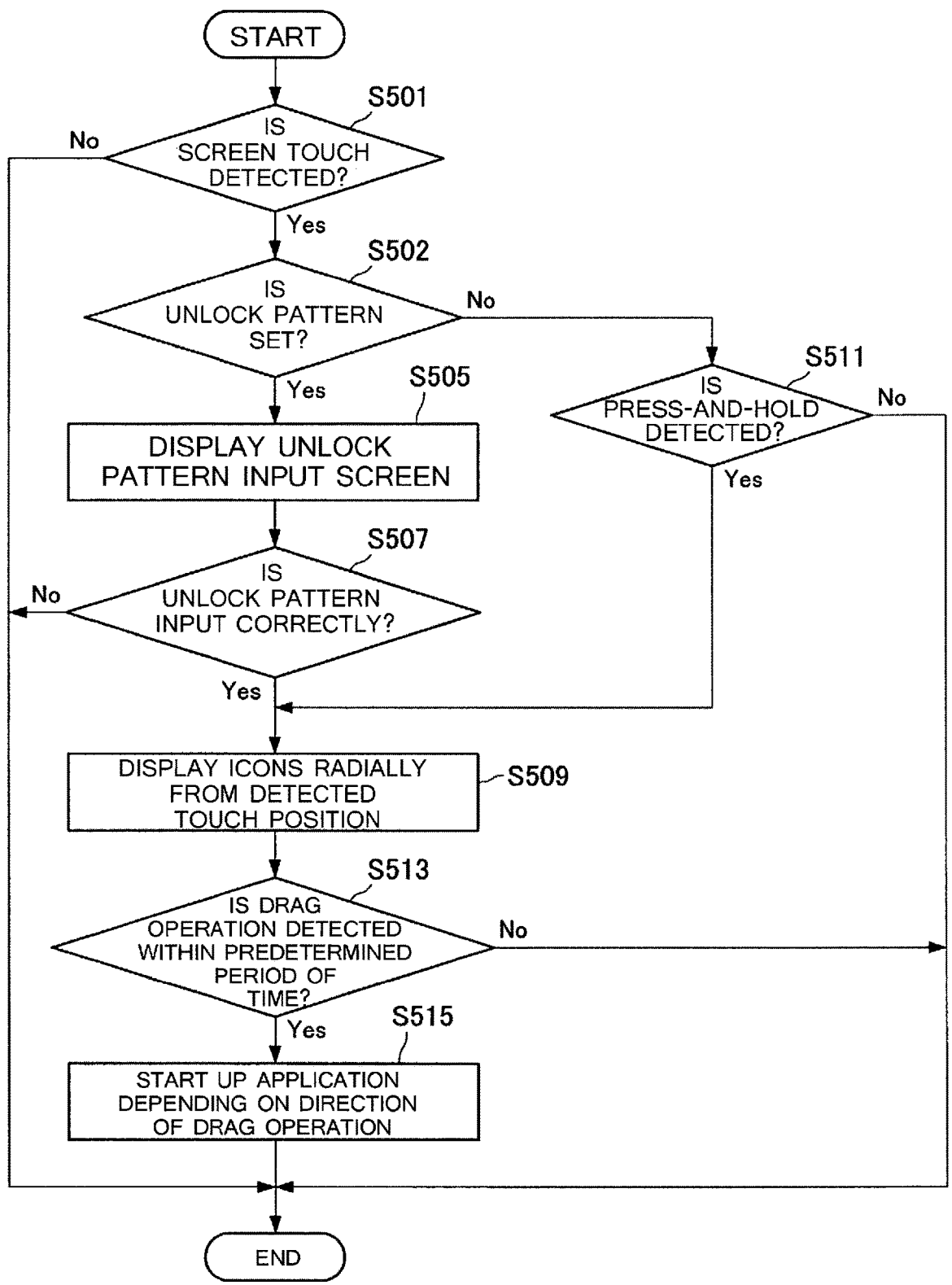

[Fig. 23]
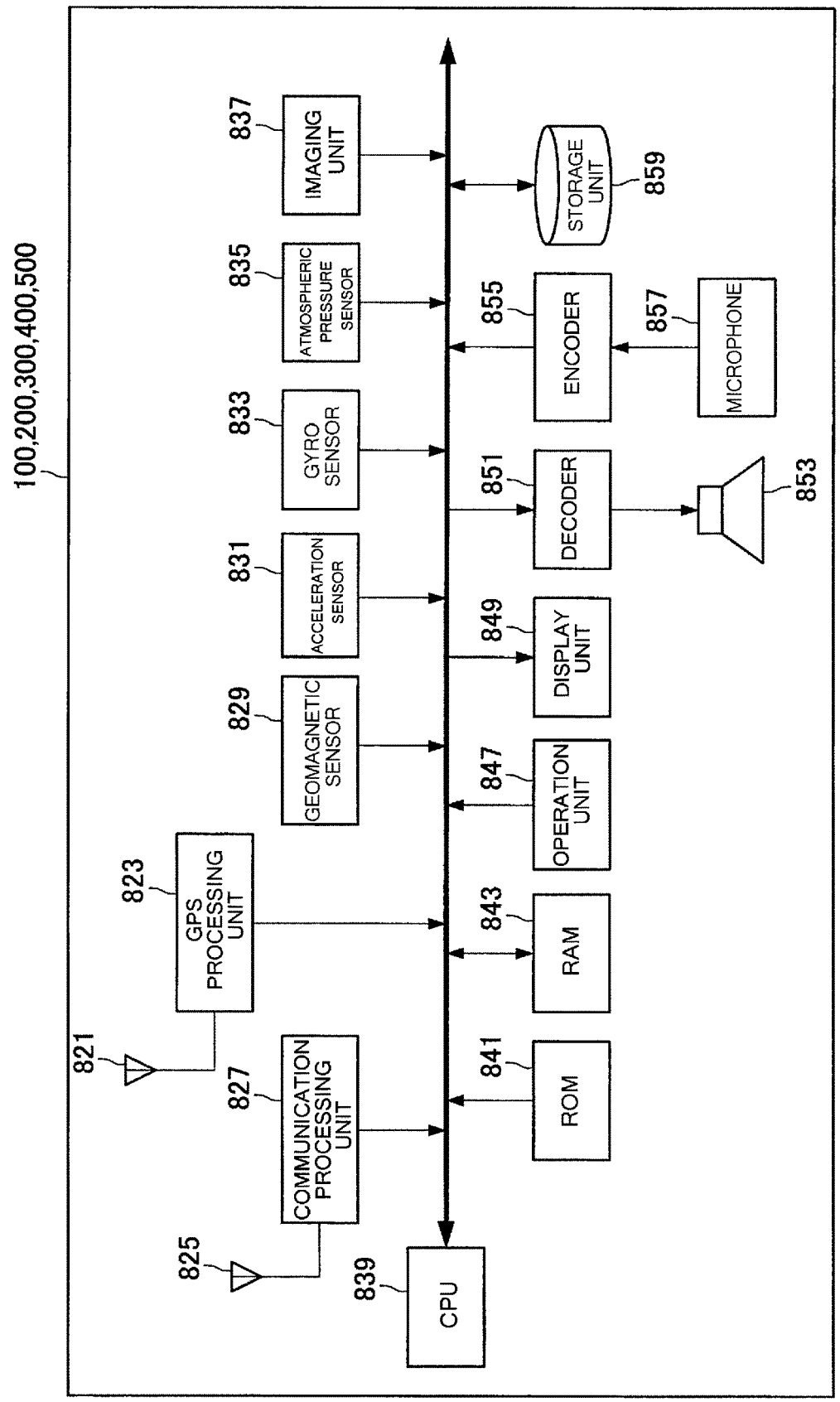

[Fig. 24]
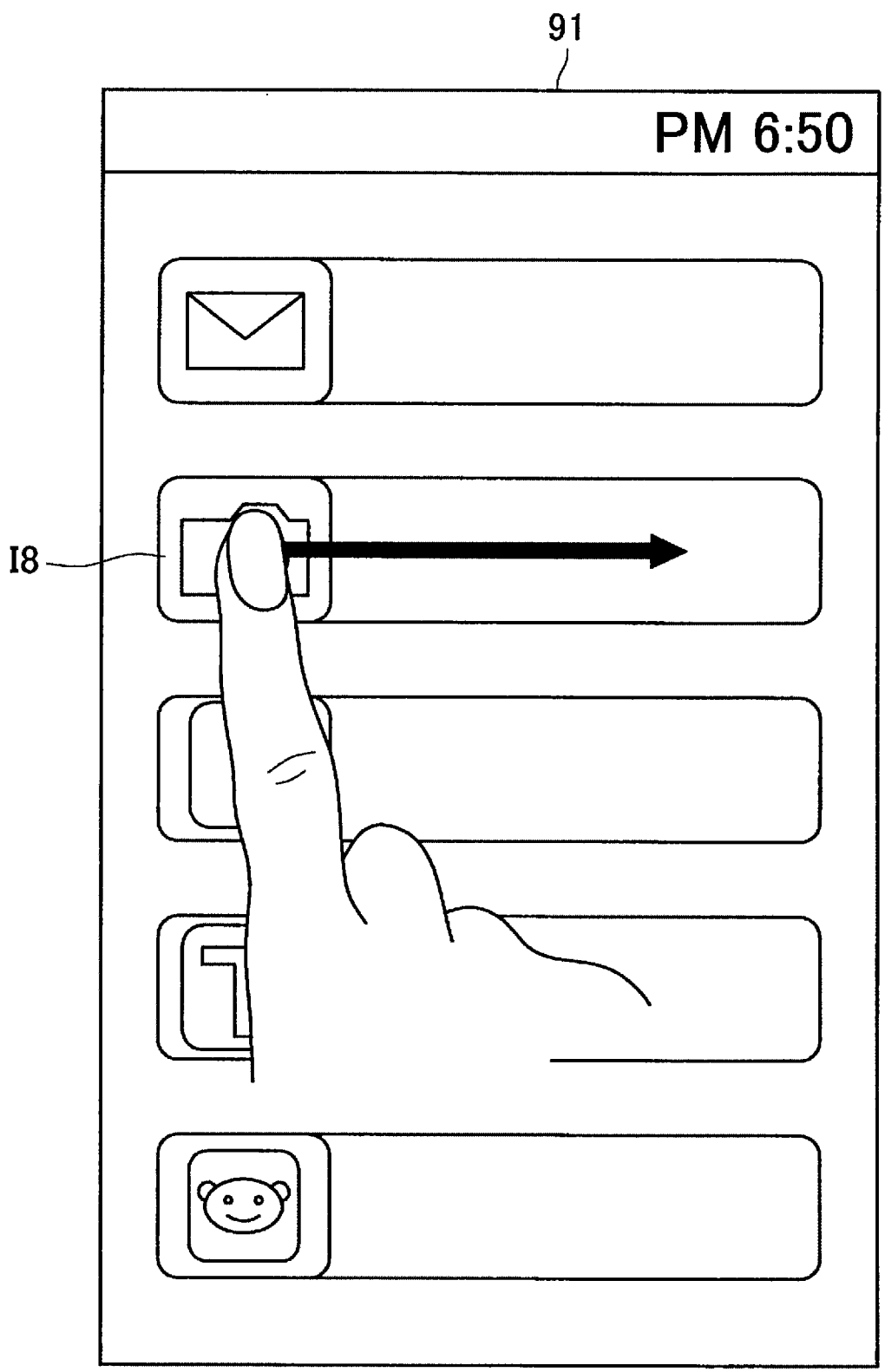

[Fig. 25]
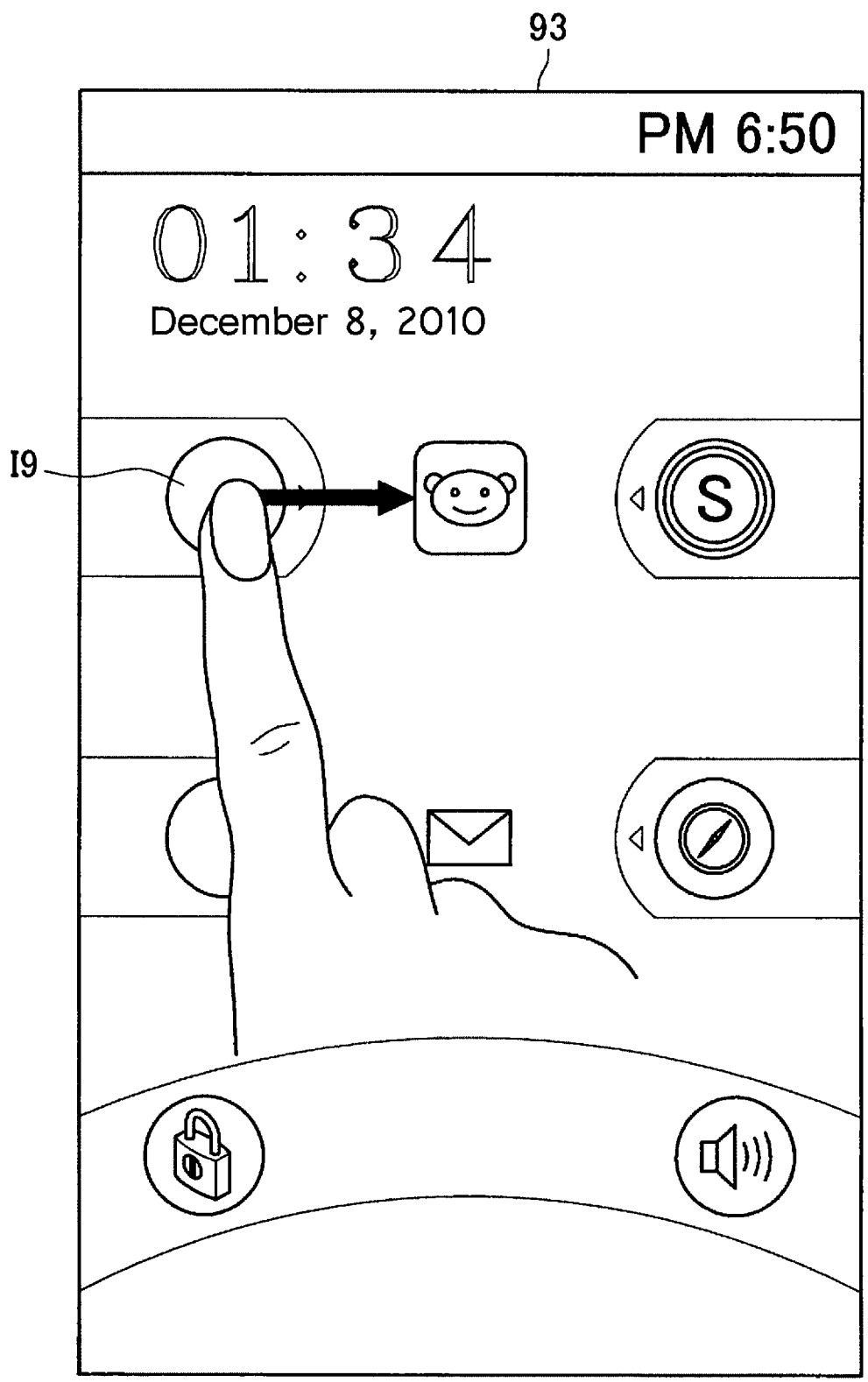

INFORMATION PROCESSING APPARATUS, INFORMATION PROCESSING METHOD, AND COMPUTER PROGRAM PRODUCT FOR DISPLAYING DIFFERENT ITEMS TO BE PROCESSED ACCORDING TO DIFFERENT AREAS ON A DISPLAY IN A LOCKED STATE

TECHNICAL FIELD

The present disclosure relates to an information processing apparatus, an information processing method, and a computer program product.

BACKGROUND ART

Recently, an information processing apparatus, including a smart phone, in which a touch sensor or the like is mounted to perform an input manipulation by a position of a manipulation body on a display screen, has become increasingly common. Such an information processing apparatus prevents an unintended input manipulation using a locking function of restricting an input manipulation (for example, Patent Document 1). In order to use a function of an application from a locked state, a user performs an unlock manipulation and an application start-up manipulation.

CITATION LIST

Patent Literature

PTL 1: Japanese Patent Application Laid-Open No. 2011-48665

SUMMARY

Technical Problem

However, in the information processing apparatus described above, a demand for improvement in manipulability has recently been particularly increased. In consideration of this circumstance, it is also desired to improve manipulability from a locked state to an application start-up.

Solution to Problem

According to one embodiment, an information processing apparatus includes
a detector that detects an interaction position of a manipulation body on a display screen; and
a controller that
when the display screen is in a locked state, causes an arrangement of display items on the display screen to be based on a reference point, said reference point being a last contact position of a first manipulation of the manipulation body on the display screen, and
when a second manipulation of the manipulation body indicating a direction of movement from the reference point is detected, starts up an application corresponding to a display item displayed in the direction of movement, said second manipulation occurring after said first manipulation.
According to one aspect of the embodiment,
the controller arranges the display items radially around the reference point.
According to another aspect of the embodiment, the controller selects the display items based on a position of the reference point.
According to another aspect of the embodiment,
the display screen is divided into a plurality of areas, and
the control unit selects the display item displayed in the direction of movement based on which area the detected reference point is positioned.
According to another aspect of the embodiment,
the display screen is at least one of a touch panel display and a proximity display.
According to another aspect of the embodiment, said display items are icons.
According to another aspect of the embodiment,
the application is hosted on a remote computer.
According to another aspect of the embodiment, the apparatus further includes
a behavior recognition unit configured to recognize a behavior of a user,
wherein the controller selects the display item displayed in the direction of movement based on a behavior of the user recognized by the behavior recognition unit.
According to another aspect of the embodiment,
when the direction of movement of the second manipulation is between respective display items, the display screen displays a home screen.
According to another aspect of the embodiment,
the first manipulation is to authenticate a device owner, and
the second manipulation is to start up the application.
According to another aspect of the embodiment, the apparatus further includes
a case; and
a case direction detection unit configured to detect a direction of the case,
wherein the controller displays different sets of display items depending on the direction of the case.
According to another aspect of the embodiment,
the first manipulation is a press-and-hold manipulation that includes pressing and holding at a point of the display screen for a predetermined period of time.
According to a method embodiment, the method includes
detecting an interaction position of a first manipulation on a display screen when in a locked state;
displaying on the display screen an arrangement of display items based on a reference point indicating a last contact position of a manipulation body when the first manipulation is completed;
detecting a second manipulation indicating a direction of movement from the reference point; and
starting up an application corresponding to a display item displayed in the direction of movement, said second manipulation occurring after said first manipulation.
According to one aspect of the method, the displaying includes arranging the arrangement of display items radially around the reference point.
According to another aspect of the embodiment, the displaying includes displaying the arrangement of display items based on a position of the reference point.
According to another aspect of the embodiment,
the display screen is divided into a plurality of areas, and
the displaying includes displaying the arrangement of display items based on which area the detected reference point is positioned.
According to another aspect of the embodiment,
the detecting an interaction position includes detecting the interaction position on one of a touch panel display and a proximity display.

According to another aspect of the embodiment,
the displaying includes displaying the arrangement of display items as an arrangement of icons.

According to another aspect of the embodiment,
the starting up includes starting up the application on a remote computer.

According to a non-transitory computer readable storage medium embodiment, the storage medium has instructions stored therein that when executed by a processor perform an information processing method, the method includes detecting an interaction position of a first manipulation on a display screen when in a locked state;

displaying on the display screen an arrangement of display items based on a reference point indicating a last contact position of a manipulation body when the first manipulation is completed;

detecting a second manipulation indicating a direction of movement from the reference point; and starting up an application corresponding to a display item displayed in the direction of movement, said second manipulation occurring after said first manipulation.

Advantageous Effects of Invention

According to the present disclosure, manipulability from a locked state to an application start-up can be improved.

BRIEF DESCRIPTION OF DRAWINGS

FIG. 1 is an explanatory diagram illustrating an example of an external appearance of a portable terminal according to a first embodiment of the present disclosure.

FIG. 2 is a functional block diagram of the portable terminal according to the same embodiment.

FIG. 3 is an explanatory diagram illustrating an example of a manipulation on a display screen according to the same embodiment.

FIG. 4 is an explanatory diagram for describing another example of an icon display according to the same embodiment.

FIG. 5 is an explanatory diagram for describing an example of a home screen start-up according to the same embodiment.

FIG. 6 is an explanatory diagram for describing another example of an icon display according to the same embodiment.

FIG. 7 is an explanatory diagram for describing an example of selecting an icon to be displayed based on a touch position according to the same embodiment.

FIG. 8 is a flow chart illustrating an example of an operation of the portable terminal according to the same embodiment.

FIG. 9 is a functional block diagram of a portable terminal according to a second embodiment of the present disclosure.

FIG. 10 is an example of a display screen displayed when a user is in a company, according to the same embodiment.

FIG. 11 is an example of a display screen displayed when it is determined that a user is on vacation, according to the same embodiment.

FIG. 12 is an example of a display screen displayed when a user is on a train, according to the same embodiment.

FIG. 13 is a flow chart illustrating an example of an operation of the portable terminal according to the same embodiment.

FIG. 14 is a functional block diagram of a portable terminal according to a third embodiment of the present disclosure.

FIG. 15 is an example of a display screen displayed when a user is jogging, according to the same embodiment.

FIG. 16 is a flow chart illustrating an example of the operation of the portable terminal according to the same embodiment.

FIG. 17 is a functional block diagram of a portable terminal according to a fourth embodiment of the present disclosure.

FIG. 18 is an example of a display screen displayed when a case is held sideways, according to the same embodiment.

FIG. 19 is a flow chart illustrating an example of the operation of the portable terminal according to the same embodiment.

FIG. 20 is a functional block diagram of a portable terminal according to a fifth embodiment of the present disclosure.

FIG. 21 is an example of a display screen to perform an unlock manipulation, including an owner identification, which is displayed on the portable terminal according to the same embodiment.

FIG. 22 is a flow chart illustrating an example of the operation of the portable terminal according to the same embodiment.

FIG. 23 is a block diagram illustrating a hardware configuration of the portable terminals according to the first to fifth embodiments of the present disclosure.

FIG. 24 is an explanatory diagram illustrating an example of a conventional unlock screen.

FIG. 25 is an explanatory diagram illustrating another example of the conventional unlock screen.

DESCRIPTION OF EMBODIMENTS

Hereinafter, preferred embodiments of the present disclosure will be described in detail with reference to the appended drawings. Note that, in this specification and the drawings, elements that have substantially the same function and structure are denoted with the same reference signs, and explanation thereof is not repeated.

In addition, a description will be given in the following order.

1. First Embodiment
 1-1. Example of Configuration
 1-2. Example of Display Screen
 1-3. Example of Operation
2. Second Embodiment (example of icon selection based on position information)
 2-1. Example of Configuration
 2-2. Example of Display Screen
 2-3. Example of Operation
3. Third Embodiment (example of icon selection based on behavior recognition)
 3-1. Example of Configuration
 3-2. Example of Display Screen
 3-3. Example of Operation
4. Fourth Embodiment (example of icon selection based on case direction)
 4-1. Example of Configuration
 4-2. Example of Display Screen
 4-3. Example of Operation
5. Fifth Embodiment (example of unlock, including owner identification)
 5-1. Example of Configuration
 5-2. Example of Display Screen
 5-3. Example of Operation
6. Example of Hardware Configuration

1. First Embodiment (1-1. Example of Configuration)

First, a schematic configuration of a portable terminal 100 according to a first embodiment of the present disclosure will be described with reference to FIGS. 1 and 2. FIG. 1 is an explanatory diagram illustrating an example of an external appearance of the portable terminal according to the first embodiment of the present disclosure. FIG. 2 is a functional block diagram of the portable terminal according to the same embodiment.

As illustrated in FIG. 1, the portable terminal 100 includes a display unit 103 on a surface of a case, and a touch sensor 105 overlapping the display unit 103. Also, the portable terminal 100 may also be combined with a manipulation unit by a button or the like, separately from the touch sensor. Due to such a configuration, the portable terminal 100 may receive a user input by a position of a manipulation body on a display screen displayed on the display unit 103. In addition, the portable terminal 100 may use a so-called Graphical User Interface (GUI) to control contents of the display screen based on the user input.

The portable terminal 100 is an example of an information processing apparatus in which manipulability from a locked state to an application start-up manipulation is improved. For example, the portable terminal 100 may be a portable phone including a smart phone, and may also be an information processing apparatus, such as a portable music reproduction apparatus, a portable video processing apparatus, a portable game machine, a notebook Personal Computer (PC), a tablet type PC, or the like. In addition, although a portable terminal device is exemplarily described herein, the present technology may be applied to all information processing apparatuses having a locking function. While the above description explains a situation where the application is executed on the device, the unlock operation may also be to used to trigger the execution of an application hosted on a remote processor. Moreover, the terminal device may communication a trigger signal to a remote device, in response to the user's interaction on the local device.

The portable terminal 100, as illustrated in FIG. 2, is an information processing apparatus that mainly includes a display unit 103, a touch sensor 105, and a control unit 107. Also, although a configuration for describing the function of the portable terminal 100 according to the same embodiment will be mainly described herein, the portable terminal 100 may be an information processing apparatus having various other functions. An example of a hardware configuration of the portable terminal 100 will be described later.

The display unit 103 is an example of an output device and may be a display device, such as a liquid crystal display (LCD) device, an organic light emitting diode (OLED) display device, or the like.

The touch sensor 105 is an example of an input unit and is an example of a detection unit that detects a position of a manipulation body on a sensor. Herein, since the touch sensor 105 is installed to overlap the display unit 103 that displays a display screen, the touch sensor 105 may detect a position of the manipulation body on the display screen. Also, the touch sensor 105 used herein may be a contact type sensor that detects the position of the manipulation body in contact with a surface of a detection surface side of the touch sensor 105 in the case. Alternatively, the touch sensor 105 may also be a contactless type sensor that detects the position of the manipulation body over the detection surface of the sensor. The manipulation body that performs an input manipulation on the touch sensor 105 may be, for example, a user's finger. Alternatively, the manipulation body may be a stylus.

The control unit 107 has a function of controlling the overall operation of the portable terminal 100. For example, the control unit 107 may function as a display control unit that controls contents of the display screen to be displayed on the display unit 103 based on position information of the manipulation body input from the touch sensor 105. In addition, for example, when the display unit 103 displays a display screen, including icons of applications, and a user's manipulation of selecting the displayed icons is detected, the control unit 107 may start up the applications corresponding to the selected icons. Moreover, the control unit 107 may control operations of the respective started applications.

Control contents of the control unit 107 with respect to a manipulation from a locked state to an application start-up in the present embodiment herein will be described. In addition, the locking as mentioned herein means a function of restricting a user input. When in the locked state, for example, user manipulations other than a predetermined manipulation are entirely invalidated. An example of the predetermined manipulation includes an unlock manipulation, an emergency notification manipulation, or the like. A transition to the locked state is performed, for example, in the case in which a non-manipulation state has continued for a predetermined period of time, a case in which a predetermined lock start-up manipulation is performed by a user, or the like. Such a configuration may prevent an input contrary to a user's intention from being performed.

When a first manipulation is performed on the display screen in the locked state, the control unit 107 arranges icons with reference to a point (reference point) indicating the position of the manipulation body when the first manipulation is completed. Herein, it is preferable that the icons be arranged at a position where one icon is specified with respect to a direction from the reference point. For example, the icons may be arranged radially around the reference point. Also, the icons may also be arranged in a row. When the user performs a second manipulation indicating the direction from the reference point, the control unit 107 may start up an application corresponding to an icon specified by the second manipulation. Also, herein, the first manipulation in the present embodiment is a manipulation (for example, a press-and-hold manipulation) indicating an arbitrary point on a display screen over a predetermined period of time. Also, the second manipulation is a drag manipulation indicating one direction from the reference point.

The control unit 107 also has a function as a selection unit that selects icons to be displayed herein. The control unit 107, for example, may select icons to be displayed in units of a set of pre-selected icons. Alternatively, the control unit 107 may create a set of icons to be displayed by selecting icons one by one. In the present embodiment, the control unit 107 displays a set of pre-selected icons on the display screen. The set of icons, for example, may be a set of icons pre-selected by the user. Alternatively, the set of icons may be a set of icons pre-selected before shipment of the portable terminal 100. When a position corresponding to a reference point, at which each icon among a set of icons prepared beforehand is to be displayed, is predetermined, the user may perform an icon selection manipulation without looking at the display screen, and thus there is an effect of improving manipulability. In addition, the control unit 107 may also select a set of icons to be displayed based on the position of the reference point on the display screen. For example, a case in which an upper half area of the display screen is predetermined as an area for starting up a utility application and a lower half area of the display screen is predetermined as an area for starting up a social application is assumed. In this case, when a position of a press-and-hold manipulation detected by the touch sensor is the upper half area of the display screen, the control unit 107 may display a set of icons corresponding to the utility application.

Also, when displaying the icons, the control unit 107 may display the number of new information of the applications corresponding to the respective icons. According to such a display, the user may know the presence/absence and the number of the new information, without starting up the applications. For example, in the case of a mail application, the new information may be the number of unread mails. Alternatively, in the case of an application for connection to a social networking service, the new information may be the number of notifications of new postings and mails, or the like.

The example of the functions of the portable terminal 100 according to the present embodiment has been shown above. The respective elements described above may be configured using general-purpose members or circuits, or may be configured by hardware specialized in the functions of the respective elements. Also, an arithmetic device, such as a central processing unit (CPU) or the like, may perform the functions of the respective elements by reading a control program from a storage medium, such as a read only memory (ROM), a random access memory (RAM), or the like, which stores the control program describing a processing procedure of realizing these functions, and by interpreting and executing the program. Therefore, the configuration to be used may be appropriately modified depending on a level of technology when the present embodiment is implemented. Also, an example of a hardware configuration of the portable terminal 100 will be described later.

Also, a computer program for realizing the respective functions of the portable terminal 100 according to the present embodiment described above may be created and implemented on a personal computer or the like. Also, a computer-readable recording medium on which such a computer program is stored may also be provided. The recording medium may be, for example, a magnetic disk, an optical disc, a magneto-optical disc, a flash memory, or the like. Also, the computer program may also be delivered through a network without using the recording medium.

(1-2. Example of Display Screen)

Next, an example of a display screen displayed on the display unit 103 of the portable terminal 100 will be described with reference to FIGS. 3 to 7. FIG. 3 is an explanatory diagram illustrating an example of a manipulation on a display screen according to the same embodiment. FIG. 4 is an explanatory diagram for describing another example of an icon display according to the same embodiment. FIG. 5 is an explanatory diagram for describing an example of a home screen start-up according to the same embodiment. FIG. 6 is an explanatory diagram for describing another example of an icon display according to the same embodiment. FIG. 7 is an explanatory diagram for describing an example of selecting an icon to be displayed based on a touch position according to the same embodiment.

Also, in the present specification and drawings, there are cases in which a plurality of elements having substantially the same functional configuration are distinguished by assigning different letters or numerals after the same reference sign. For example, a plurality of elements having substantially the same functional configuration, if necessary, are distinguished as in an icon Ia and an icon Ib. However, if each of a plurality of elements having substantially the same functional configuration need not be especially distinguished, only the common reference sign is assigned thereto. For example, if an icon Ia, an icon Ib, and the like, need not be especially distinguished, the icons are simply referred to as icons I.

First, an example of a display screen at the time of unlocking the portable terminal 100 according to the present embodiment will be described with reference to FIG. 3. As illustrated in FIG. 3(A), the user touches an arbitrary point of a display screen 10 in a locked state with a finger (example of a manipulation body) and performs a so-called press-and-hold manipulation of maintaining the position P1 of the finger over a predetermined period of time. Then, as illustrated in FIG. 3(B), the control unit 107 radially arranges icons I around the position P1 of the finger detected on the display screen 10.

Herein, for example, an icon Ia for starting up a mail application, an icon Ib for starting up an imaging application, an icon Ic for starting up an application to connect to a short web log service, and an icon Id and an icon Ie for starting up application to connect to social network services (SNSs) are displayed radially. If the user performs a drag manipulation in a direction toward one of the displayed icons I, the control unit 107 starts up an application corresponding to an icon specified by the drag manipulation. In the example of FIG. 3(C), the user performs a drag manipulation in a direction toward the icon Ib corresponding to the imaging application, as indicated by an arrow. Therefore, the control unit 107 starts up the imaging application corresponding to the icon Ib.

The icons I displayed herein, for example, may be a set of icons I predetermined before shipment of the portable terminal 100. Alternatively, the displayed icons I may be a set of icons I corresponding to applications selected by the user. The user may pre-select an application that is frequently used. Also, in this case, the user may also preset positions at which the respective icons I are to be displayed. When the user knows in advance positions at which the icons I are to be displayed corresponding to the position P1 of the finger, the user may perform an unlock to an application start-up without looking at the display screen 10. The user need only perform a press-and-hold manipulation at an arbitrary position on the display screen 10 and perform a drag manipulation in a direction of the icons I of an application to be started up. Due to such a manipulation, the unlock and the application start-up may be performed by a series of manipulations in which the user does not release the finger from the screen.

For example, as the user interface that performs the unlock and the application start-up by a series of manipulations, a display screen 91 and a display screen 93 illustrated in FIGS. 24 and 25 are suggested. For example, on the display screen 91 illustrated in FIG. 24, by dragging one of displayed icons I, for example, an icon 18, to the right and sliding the icon 18 to the right edge of the screen, the user may start up an application corresponding to the manipulated icon 18. Also, similarly, on the display screen 93 illustrated in FIG. 25, by dragging one of displayed icons I, for example, an icon 19, to the right or left, an application corresponding to the manipulated icon 19 may be started up. However, in the examples illustrated in FIGS. 24 and 25, the user should look at and perceive the entire display screen. On the other hand, the display screen 10 of the present embodiment displays the icons I radially around an arbitrary point the user touches. Therefore, the user need only look at the periphery of the position P1 that his or her own finger touches. Therefore, manipulability in the unlock and the application start-up is improved. Moreover, if the position at which the icon I is to be displayed corresponding to the position P1 of the finger is predetermined, the user may perform the manipulation without looking at the screen. Hence, manipulability is further improved.

Also, if the touch position is close to the edge of the display screen 10, as illustrated in FIG. 4(A), the control unit 107 may arrange the icons I in a semicircle. Alternatively, as illustrated in FIG. 4(B), the control unit 107 may arrange the icons I in a column. Herein, although an example of arranging the icons I in a vertical column is illustrated, the present technology is not limited to such an example. The icons I may also be arranged in a horizontal row.

Also, for example, as illustrated in FIG. 5(A), if the drag manipulation is performed in a direction in which there are no icons I, the control unit 107 may start up a home application. Alternatively, as illustrated in FIG. 5(B), the control unit 107 may display a home icon I0 for starting up the home application. If the home icon I0 is specified by the drag manipulation, the control unit 107 may start up the home application.

Also, as illustrated in FIG. 6, the control unit 107 may display the number of new information on the applications corresponding to the respective icons I displayed on the display screen 10, together with the icons I. Also, the control unit 107 may display contents of the new information (for example, part of a mail text) on the display screen 10.

Also, as illustrated in FIG. 7(A), the display screen 10 may be divided into a first area 11 and a second area 13. In the first area 11 and the second area 13, types of icons I displayed when manipulations are performed are different from each other. For example, the first area 11 may be an area for starting up a utility application. In the example of FIG. 7, if a press-and-hold manipulation is detected in the first area 11, an icon Ia for starting up a mail application, an icon If for starting up a call application, an icon Ig for starting up a music reproduction application, an icon Ih for starting up an application for a train transfer guide, and an icon Ii for starting up a calendar application are displayed radially around a position of a finger. Also, the second area 13 may be an area for starting up a social application. In the example of FIG. 7, if a press-and-hold manipulation is detected in the second area 13, an icon Ic for starting up an application to connect to a short web log service, an icon Ij for starting up an application to connect to a social service that shares information related to position information, an icon Ik for starting up an application to connect to a social service that shares images, and an icon Il and an icon Ie for starting up an application to connect to an SNS are displayed radially from a position of a finger.

Due to such a configuration, an option for the applications to be started up may be increased. As the number of icons I displayed radially from the position of the finger at a time is increased, an option for the applications to be started up may be increased. However, in this case, since the option is increased and a risk of an erroneous manipulation is high, manipulability is degraded. On the other hand, the method of the present embodiment, which changes the types of the icons I to be displayed in the areas, may increase the option without changing the risk of the erroneous manipulation, leading to an improvement in manipulability.

(1-3. Example of Operation)

Next, an example of an operation of starting up an application from a locked state of the portable terminal 100 according to the present embodiment will be described with reference to FIG. 8. FIG. 8 is a flow chart illustrating an example of an operation of the portable terminal according to the same embodiment.

First, the control unit 107 determines whether or not a screen touch is detected by the touch sensor 105 (S101). If the screen touch is detected, then the control unit 107 determines whether or not a manipulation of pressing and holding the detected touch position without changing over a predetermined period of time is detected (S103). If the press-and-hold manipulation is detected in step S103, the control unit 107 displays icons I based on the detected touch position (S105). Herein, the icons I, for example, may be displayed radially from the touch position.

Then, the control unit 107 determines whether or not a drag manipulation indicating a direction is detected within a predetermined period of time (S107). If the drag manipulation is detected within the predetermined period of time, the control unit 107 starts up an application depending on the direction of the drag manipulation (S109). For example, if one icon I is specified by the drag manipulation, the control unit 107 may start up an application corresponding to the specified icon I. In addition, if no icons I are specified by the drag manipulation, the control unit 107 may start up a home application.

2. Second Embodiment

Next, a second embodiment of the present disclosure will be described. As compared with the first embodiment, the second embodiment is different in a method of selecting icons to be displayed. In the following description, the differences will be mainly described and the common configuration will not be described.

(2-1. Example of Configuration)

First, a schematic configuration of a portable terminal 200 according to a second embodiment of the present disclosure will be described with reference to FIG. 9. FIG. 9 is a functional block diagram of the portable terminal according to the second embodiment of the present disclosure.

As illustrated in FIG. 9, the portable terminal 200 according to the second embodiment of the present disclosure mainly includes a display unit 103, a touch sensor 105, a control unit 207, and a position information acquisition unit 209.

The control unit 207 has a function of controlling the overall operation of the portable terminal 200. For example, the control unit 207 may function as a display control unit that controls contents of a display screen to be displayed on the display unit 103 based on position information of a manipulation body input from the touch sensor 105. Also, in this case, the control unit 207 may control contents of the display screen using current position information input from the position information acquisition unit 209. Also, in this case, the control unit 207 may control contents of the display screen using information on a current date, day of the week, time, or the like. In addition, when the display unit 103 displays a display screen, including icons I of applications, and the user's manipulation of selecting the displayed icons is detected, the control unit 207 may start up the applications corresponding to the selected icons. Moreover, the control unit 207 may control operations of the respective started applications.

The position information acquisition unit 209 has a function of acquiring position information of a current location. The position information acquisition unit 209 may be realized by, for example, a global positioning system (GPS) antenna and a GPS processing unit that calculates position information from a GPS reception signal. Alternatively, the position information acquisition unit 209 may have a function of measuring a relative position through a variety of sensors. Also, the position information acquisition unit 209 may estimate a distance between each base station and the portable device 200 from reception strengths of Wi-Fi waves received from a plurality of base stations, and may use the estimated distance and the position information of each base station to calculate the current position information based on the principle of triangulation. Also, the position information acquisition unit 209 may acquire the position information by a variety of indoor positioning technologies. For example, examples of technologies used for indoor positioning may include an indoor messaging system (IMES), also called an indoor GPS, visible light communication, infrared communication, a radio frequency identification (RFID) tag, a quick response (QR) code, or the like.

The example of the functions of the portable terminal 200 according to the present embodiment has been shown above. The respective elements described above may be configured using general-purpose members or circuits, or may be configured by hardware specialized in the functions of the respective elements. Also, an arithmetic device, such as a central processing unit (CPU) or the like, may perform the functions of the respective elements by reading a control program from a storage medium, such as a read only memory (ROM), a random access memory (RAM), or the like, which stores the control program describing a processing procedure of realizing these functions, and by interpreting and executing the program. Therefore, the configuration to be used may be appropriately modified depending on a level of technology when the present embodiment is implemented. Also, an example of a hardware configuration of the portable terminal 200 will be described later.

Also, a computer program for realizing the respective functions of the portable terminal 200 according to the present embodiment described above may be created and implemented on a personal computer or the like. Also, a computer-readable recording medium on which such a computer program is stored may be provided. The recording medium may be, for example, a magnetic disk, an optical disc, a magneto-optical disc, a flash memory, or the like. Also, the computer program may also be delivered through a network without using the recording medium.

(2-2. Example of Display Screen)

Next, an example of a display screen displayed on the display unit 103 of the portable terminal 200 will be described with reference to FIGS. 10 to 12. FIG. 10 is an example of a display screen displayed when a user is in a company, according to the same embodiment. FIG. 11 is an example of a display screen displayed when it is determined that a user is on vacation, according to the same embodiment. FIG. 12 is an example of a display screen displayed when a user is on a train, according to the same embodiment.

For example, as illustrated in FIG. 10, in the case in which the touch sensor 105 detects a press-and-hold manipulation, if position information input from the position information acquisition unit 209 indicates that a user is in a company, the control unit 207 may display a set of icons I selected based on the position information. In this case, the set of the displayed icons I may be, for example, a set of icons I pre-selected for when the user is in a company. It is preferable that the set of the icons I corresponds to applications that are frequently used when in a company. For example, in the example of FIG. 10, an icon Ia for starting up a mail application, an icon Ii for starting up a calendar application, an icon Ih for starting up an application for a train transfer guide, an icon In for starting up a map application, and an icon If for starting up a call application are displayed. Also, in this case, the control unit 207 may further select a set of icons to be displayed using information on the current date, day of the week, or the like. For example, when it is detected that the user is in a company, a set of icons I different from the above may be displayed if it is a holiday or it is a time slot other than a fixed time.

Also, as illustrated in FIG. 11, when the touch sensor 105 detects a press-and-hold manipulation, if position information input from the position information acquisition unit 209 indicates that a user is in a travel destination, the control unit 207 may display a set of icons I selected based on the position information. In this case, the set of the displayed icons I may be, for example, a set of icons I pre-selected for when the user is in a travel destination. It is preferable that the set of the icons I corresponds to applications that are thought to be frequently used when in a travel destination. For example, in the example of FIG. 11, an icon Io for starting up an application to view weather information, an icon Ig for starting up a music reproduction application, an icon Ip for starting up a web browser application, and an icon Ir for starting up a book browser application are displayed. Also, the control unit 207 may determine that the user is in a travel destination using information on a user's schedule in addition to the position information or instead of the position information.

Also, as illustrated in FIG. 12, when the touch sensor 105 detects a press-and-hold manipulation, if position information input from the position information acquisition unit 209 indicates that a user is on a train, the control unit 207 may display a set of icons I selected based on the position information. It is preferable that the set of the displayed icons I corresponds to applications that are thought to be frequently used on a train. In the example of FIG. 12, an icon Ir for starting up a book browser application, an icon Ig for starting up a music reproduction application, an icon Ii for starting up a calendar application, an icon Ie for starting up an application to connect to an SNS, and an icon Iq for starting up a video replay application are displayed. Also, for example, if the position information detects a movement on rails, the control unit 207 may determine that the user is on a train when it may be determined that the moving speed is movement by a train. Alternatively, in order to determine that the user is on the train, the control unit 207 may use detection values from sensors, such as a gyro sensor and an acceleration sensor, in combination.

(2-3. Example of Operation)

Herein, an example of an operation in an unlock and an application start-up of the portable terminal 200 according to the present embodiment will be described with reference to FIG. 13. FIG. 13 is a flow chart illustrating an example of an operation of the portable terminal according to the same embodiment.

First, the control unit 207 determines whether or not a screen touch is detected by the touch sensor 105 (S201). If the screen touch is detected, the control unit 207 then determines whether or not a manipulation of pressing and holding the detected touch position without changing over a predetermined period of time is detected (S203). If the press-and-hold manipulation is detected in step S203, the control unit 207 then acquires position information of a current location in the position information acquisition unit 209 and selects a set of icons to be displayed based on the acquired position information (S204). Then, the control unit 207 displays the selected icons I at positions based on the detected touch position (S205). Herein, the icons I, for example, may be displayed radially from the touch position.

Then, the control unit 207 determines whether or not a drag manipulation is detected within a predetermined period of time (S207). If the drag manipulation is detected within the predetermined period of time, the control unit 207 starts up an application depending on the direction of the drag manipulation (S209). For example, if one icon I is specified by the drag manipulation, the control unit 207 may start up an application corresponding to the specified icon I. In addition, if no icons I are specified by the drag manipulation, the control unit 207 may start up a home application.

As described above, according to the configuration of the portable terminal 200 according to the second embodiment of the present disclosure, a set of icons I to be displayed may be selected based on the position information. An application the user wants to start up is different depending on the user's state. Since the user's position greatly affects the user's state, selecting the icons to be displayed based on the position information is effective for the user to start up a desired application quickly.

3. Third Embodiment

Next, a third embodiment of the present disclosure will be described. As compared with the first embodiment and the second embodiment, the third embodiment is different in a method of selecting icons to be displayed. In the following description, the differences will be mainly described and the common configuration will not be described.

(3-1. Example of Configuration)

First, a schematic configuration of a portable terminal 300 according to a third embodiment of the present disclosure will be described with reference to FIG. 14. FIG. 14 is a functional block diagram of the portable terminal according to the third embodiment of the present disclosure.

As illustrated in FIG. 14, the portable terminal 300 according to the third embodiment of the present disclosure mainly includes a display unit 103, a touch sensor 105, a control unit 307, a position information acquisition unit 209, and a behavior recognition unit 311.

The behavior recognition unit 311 has a function of recognizing a user's behavior. For example, the behavior recognition unit 311 may recognize the user's behavior using current position information acquired by the position information acquisition unit 209 and detection values acquired by the gyro sensor, the acceleration sensor, or the like. For example, the behavior recognition unit 311 may recognize that the user is jogging. The behavior recognition unit 311 may provide the recognition result to the control unit 307.

The control unit 307 has a function of controlling the overall operation of the portable terminal 300. For example, the control unit 307 may function as a display control unit that controls contents of a display screen to be displayed on the display unit 103 based on position information of a manipulation body input from the touch sensor 105. Also, in this case, the control unit 307 may control contents of the display screen based on a user's behavior provided from the behavior recognition unit 311. For example, when the behavior recognition unit 311 recognizes that the user is jogging, the control unit 307 may display icons I corresponding to applications frequently used while jogging on the display screen.

The example of the functions of the portable terminal 300 according to the present embodiment has been shown above. The respective elements described above may be configured using general-purpose members or circuits, or may be configured by hardware specialized in the functions of the respective elements. Also, an arithmetic device, such as a central processing unit (CPU) or the like, may perform the functions of the respective elements by reading a control program from a storage medium, such as a read only memory (ROM), a random access memory (RAM), or the like, which stores the control program describing a processing procedure of realizing these functions, and by interpreting and executing the program. Therefore, the configuration to be used may be appropriately modified depending on a level of technology when the present embodiment is implemented. Also, an example of a hardware configuration of the portable terminal 300 will be described later.

Also, a computer program for realizing the respective functions of the portable terminal 300 according to the present embodiment described above may be created and implemented on a personal computer or the like. Also, a computer-readable recording medium on which such a computer program is stored may also be provided. The recording medium may be, for example, a magnetic disk, an optical disc, a magneto-optical disc, a flash memory, or the like. Also, the computer program may also be delivered through a network without using the recording medium.

(3-2. Example of Display Screen)

Next, an example of a display screen displayed on the display unit 103 of the portable terminal 300 will be described with reference to FIG. 15. FIG. 15 is an example of a display screen displayed when a user is jogging, according to the same embodiment.

For example, as illustrated in FIG. 15, when the touch sensor 105 detects a press-and-hold manipulation, if a recognition result provided from the behavior recognition unit 311 indicates that a user is jogging, the control unit 307 may display a set of icons I selected based on the recognition result. In this case, the set of the displayed icons I may be, for example, a set of icons I pre-selected in order to be displayed during jogging. It is preferable that the set of the icons I corresponds to applications that are thought to be frequently used while jogging. For example, in the example of FIG. 15, an icon Ig for starting up a music reproduction application, an icon Is for starting up a route guidance application, and an icon It for starting up a jogging support application are displayed.

(3-3. Example of Operation)

Herein, an example of an operation in an unlock and an application start-up of the portable terminal 300 according to the present embodiment will be described with reference to FIG. 16. FIG. 16 is a flow chart illustrating an example of an operation of the portable terminal according to the same embodiment.

First, the control unit 307 determines whether or not a screen touch is detected by the touch sensor 105 (S301). If the screen touch is detected, the control unit 307 then determines whether or not a manipulation of pressing and holding the detected touch position without changing over a predetermined period of time is detected (S303). If the press-and-hold manipulation is detected in step S303, the control unit 307 then acquires a behavior recognition result from the behavior recognition unit 311 and selects a set of icons to be displayed based on the acquired recognition result (S304). Then, the control unit 307 displays the icons I based on the detected touch position (S305). Herein, the icons I, for example, may be displayed radially from the touch position.

Then, the control unit 307 determines whether or not a drag manipulation indicating a direction is detected within a predetermined period of time (S307). If the drag manipulation is detected within the predetermined period of time, the control unit 307 starts up an application depending on the direction of the drag manipulation (S309). For example, if one icon I is specified by the drag manipulation, the control unit 307 may start up an application corresponding to the specified icon I. In addition, if no icons I are specified by the drag manipulation, the control unit 307 may start up a home application.

As described above, according to the configuration of the portable terminal 300 according to the third embodiment of the present disclosure, a set of icons I to be displayed may be selected based on the behavior recognition result. An application the user wants to start up is different depending on the user's state. If the behavior recognition technology is used, the user's state may be recognized more accurately than the second embodiment in which the user's state is estimated simply based on the position information. Therefore, selecting the icons to be displayed based on the behavior recognition result is effective for the user to start up a desired application quickly.

4. Fourth Embodiment

Next, a fourth embodiment of the present disclosure will be described. The fourth embodiment is different from the first to third embodiments in that icons to be displayed have different configurations depending on a direction of a case of a portable terminal. In the following description, the differences will be mainly described and the common configuration will not be described.

(4-1. Example of Configuration)

First, a schematic configuration of a portable terminal 400 according to a fourth embodiment of the present disclosure will be described with reference to FIG. 17. FIG. 17 is a functional block diagram of the portable terminal according to the fourth embodiment of the present disclosure.

As illustrated in FIG. 17, the portable terminal 400 according to the fourth embodiment of the present disclosure mainly includes a display unit 103, a touch sensor 105, a control unit 407, and a case direction detection unit 413.

The case direction detection unit 413 is, for example, a triaxial acceleration sensor, and may detect a direction of a case. For example, herein, a direction in which a longitudinal direction of the case is generally horizontal may be referred to as sideways. On the other hand, a direction in which a transverse direction of the case is generally horizontal may be referred to as vertical. The case direction detection unit 413 may provide the detected direction of the case to the control unit 407.

The control unit 407 has a function of controlling the overall operation of the portable terminal 400. For example, the control unit 407 may function as a display control unit that controls contents of a display screen to be displayed on the display unit 103 based on position information of a manipulation body input from the touch sensor 105. Also, in this case, the control unit 407 may control contents of the display screen based on the direction of the case provided from the case direction detection unit 413. For example, when the case direction detection unit 413 detects that the case is held sideways, the control unit 407 may display icons I for starting up applications that are frequently used sideways.

Also, it is obvious that the portable terminal 400 may include the combination of the configurations described in the first to third embodiments. For example, the portable terminal 400 may display at least one of the number of new information and a part of contents on a screen displaying icons I. Also, the portable terminal 400 may divide the display screen into a plurality of areas and display different icons I in each area. Also, the portable terminal 400 may further include the configuration of the position information acquisition unit 209 and select icons I to be displayed based on the acquired position information. Alternatively, the portable terminal 400 may include the configuration of the behavior recognition unit 311 and select icons I to be displayed based on the acquired recognition result.

The example of the functions of the portable terminal 400 according to the present embodiment has been shown above. The respective elements described above may be configured using general-purpose members or circuits, or may be configured by hardware specialized in the functions of the respective elements. Also, an arithmetic device, such as a central processing unit (CPU) or the like, may perform the functions of the respective elements by reading a control program from a storage medium, such as a read only memory (ROM), a random access memory (RAM), or the like, which stores the control program describing a processing procedure of realizing these functions, and by interpreting and executing the program. Therefore, the configuration to be used may be appropriately modified depending on a level of technology when the present embodiment is implemented. Also, an example of a hardware configuration of the portable terminal 400 will be described later.

Also, a computer program for realizing the respective functions of the portable terminal 400 according to the present embodiment described above may be created and implemented on a personal computer or the like. Also, a computer-readable recording medium on which such a computer program is stored may also be provided. The recording medium may be, for example, a magnetic disk, an optical disc, a magneto-optical disc, a flash memory, or the like. Also, the computer program may also be delivered through a network, without using the recording medium.

(4-2. Example of Display Screen)

Next, an example of a display screen displayed on the display unit 103 of the portable terminal 400 will be described with reference to FIG. 18. FIG. 18 is an example of a display screen displayed when the portable terminal is held sideways, according to the same embodiment.

For example, as illustrated in FIG. 18, when the touch sensor 105 detects a press-and-hold manipulation, if the direction of the case provided from the case direction detection unit 413 indicates that the case is held sideways, the control unit 407 may display a set of icons I selected based on the direction of the case. In this case, it is preferable that the set of the icons I to be displayed corresponds to applications that are frequently used when the case is held sideways. For example, in the example of FIG. 18, an icon Ib and an icon Iu for starting up imaging applications, an icon Iv for starting up a TV viewing application, and an icon Iq for starting up a video replay application are displayed. As shown herein, since it is highly likely that an image handling application will require a relatively large screen, there is a high probability that the portable terminal will be used sideways. The case in which the portable terminal is held sideways makes it easy to access icons I for starting up applications having a high possibility of sideways use. Therefore, the user may start up a desired application more quickly.

(4-3. Example of Operation)

Herein, an example of an operation in an unlock and an application start-up of the portable terminal 400 according to the present embodiment will be described with reference to FIG. 19. FIG. 19 is a flow chart illustrating an example of an operation of the portable terminal according to the same embodiment.

First, the control unit 407 determines whether or not a screen touch is detected by the touch sensor 105 (S401). If the screen touch is detected, the control unit 407 then determines whether or not a manipulation of pressing and holding the detected touch position without changing over a predetermined period of time is detected (S403). If the press-and-hold manipulation is detected in step S403, the control unit 407 then acquires a direction of a case from the case direction detection unit 413 and selects a set of icons to be displayed based on the acquired direction (S404). Then, the control unit 407 displays the selected icons I radially from the detected touch position (S405).

Then, the control unit 407 determines whether or not a drag manipulation indicating a direction is detected within a predetermined period of time (S407). If the drag manipulation is detected within the predetermined period of time, the control unit 407 starts up an application depending on the direction of the drag manipulation (S409). For example, if one icon I is specified by the drag manipulation, the control unit 407 may start up an application corresponding to the specified icon I. In addition, if no icons I are specified by the drag manipulation, the control unit 407 may start up a home application.

5. Fifth Embodiment

Next, a portable terminal 500 according to a fifth embodiment of the present disclosure will be described. Although different embodiments of how to select icons to be displayed have been described in the first to fourth embodiments, the present embodiment is different from the first to fourth embodiments in an unlock method. Also, in the fifth embodiment, a method of selecting icons to be displayed may take any configuration of the first to fourth embodiments. In the following description, the difference will be mainly described and the common configuration will not be described.

First, a schematic configuration of a portable terminal 500 according to the present embodiment will be described with reference to FIG. 20. FIG. 20 is a functional block diagram of the portable terminal according to the fifth embodiment of the present disclosure.

As illustrated in FIG. 20, the portable terminal 500 according to the fifth embodiment of the present disclosure mainly includes a display unit 103, a touch sensor 105, and a control unit 507.

In the first to fourth embodiments, the unlock manipulation is performed by a press-and-hold manipulation at an arbitrary point on a display screen. However, in the present embodiment, an unlock pattern is used. When the unlock pattern as described herein is used, a pattern connecting a plurality of points displayed on the display screen is compared with a pattern pre-registered as a pattern for unlock, and a lock is unlocked if they match. By such a configuration, the lock may be unlocked only when a user is identified as an owner of the portable terminal 500. Also, the pattern used herein is a pattern that may be drawn in one stroke.

The control unit 507 has a function of controlling the overall operation of the portable terminal 500. For example, the control unit 507 may function as a display control unit that controls contents of a display screen to be displayed on the display unit 103 based on position information of the manipulation body input from the touch sensor 105. Also, the control unit 507 may function as an authentication unit that identifies an owner of the portable terminal 500. For example, when a screen touch on a display screen in a locked state is detected, the control unit 507 may check whether or not an unlock pattern is set. When the unlock pattern is set, the control unit 507 displays an unlock pattern input screen. When an input manipulation is performed on the input screen, the control unit 507 compares an input pattern detected by the touch panel 105 with a pre-registered pattern. As the comparison result, if the two patterns match, the control unit 507 displays icons I arranged radially around a last point of the input pattern. Also, if a drag manipulation on any one of the displayed icons I is detected, the control unit 507 may start up an application corresponding to an icon I specified by the drag manipulation. Although the touch panel display 105 is described as requiring a touch, the display may also be a proximity display device that allows a user to interact with the display without needing to physically touch the display.

Also, as described above, the portable terminal 500 may use any method of the first to fourth embodiments to display icons I. That is, the portable terminal 500 may display at least one of the number of new information and a part of contents on a screen displaying icons I. Also, when the unlock pattern is not set, the portable terminal 500 may divide the display screen into a plurality of areas and display different icons I in each area. Also, the portable terminal 500 may further include the configuration of the position information acquisition unit 209 and select icons I to be displayed based on the acquired position information. Alternatively, the portable terminal 500 may include the configuration of the behavior recognition unit 311 and select icons I to be displayed based on the acquired recognition result. Also, the portable terminal 500 may include the configuration of the case direction detection unit 413 and select icons I to be displayed depending on the direction of the case.

The example of the functions of the portable terminal 500 according to the present embodiment has been shown above. The respective elements described above may be configured using general-purpose members or circuits, or may be configured by hardware specialized in the functions of the respective elements. Also, an arithmetic device, such as a central processing unit (CPU) or the like, may perform the functions of the respective elements by reading a control program from a storage medium, such as a read only memory (ROM), a random access memory (RAM), or the like, which stores the control program describing a processing procedure of realizing these functions, and by interpreting and executing the program. Therefore, the configuration to be used may be appropriately modified depending on a level of technology when the present embodiment is implemented. Also, an example of a hardware configuration of the portable terminal 500 will be described later.

Also, a computer program for realizing the respective functions of the portable terminal 500 according to the present embodiment described above may be created and implemented on a personal computer or the like. Also, a computer-readable recording medium on which such a computer program is stored may also be provided. The recording medium may be, for example, a magnetic disk, an optical disc, a magneto-optical disc, a flash memory, or the like. Also, the computer program may also be delivered through a network, without using the recording medium.

(5-1. Example of Display Screen)

First, an example of a display screen displayed on the display screen 103 of the portable terminal 500 according to the present embodiment will be described with reference to FIG. 21. FIG. 21 is an example of a display screen for performing an unlock manipulation, including an owner identification (or authentication), which is displayed on the portable terminal according to the fifth embodiment of the present disclosure.

For example, as illustrated in FIG. 21(A), it is assumed that when the control unit 507 displays the unlock pattern input screen, the user draws a pattern as indicated by arrows. In this case, the control unit 507 compares the input pattern with the pre-registered pattern. If the input pattern matches the pre-registered pattern, the control unit 507 displays icons I radially around a last point P2 of the pattern (FIG. 21(B)). Herein, if the user performs a drag manipulation on any one of the displayed icons I (FIG. 21(C)), an application corresponding to an icon I of a direction in which the drag manipulation is detected is started up, as with the first to fourth embodiments.

(5-2. Example of Operation)

Herein, an example of an operation in the unlock and the application start-up of the portable terminal 500 will be described with reference to FIG. 22. FIG. 22 is a flow chart illustrating an example of an operation of the portable terminal according to the same embodiment.

First, the control unit 507 determines whether or not a screen touch is detected by the touch sensor 105 (S501). Then, the control unit 507 determines whether or not an unlock pattern is set (S502). Herein, if the unlock pattern is set, the control unit 507 displays the unlock pattern input screen on the display unit 103 (S505). If the user performs the input manipulation on the input screen, the control unit 507 compares the input pattern with the pre-registered pattern and determines whether or not the unlock pattern is input correctly (S507). In step S507, if it is determined that the unlock pattern is input correctly, then the control unit 507 displays icons I radially from the detected touch position (herein, the last point of the unlock pattern) (S509).

On the other hand, in step S502, if it is determined that the unlock pattern is not set, then the control unit 507 determines whether or not a press-and-hold manipulation is detected by the touch sensor 105 (S511). Herein, if the press-and-hold manipulation is detected, the control unit 507 displays icons I radially around the detected touch position (herein, pressed-and-held point).

Then, the control unit 507 determines whether or not a drag manipulation is detected within a predetermined period of time (S513). If the drag manipulation is detected in step S513, the control unit 507 starts up an application depending on the direction of the drag manipulation (S515). For example, if one icon I is specified by the drag manipulation, the control unit 507 may start up an application corresponding to the specified icon I. In addition, if no icons I are specified by the drag manipulation, the control unit 507 may start up a home application.

The portable terminal 500 according to the fifth embodiment of the present disclosure has been described above. According to such a configuration, even when the application is started up after the unlock manipulation of performing the owner identification, manipulability may be improved. In particular, according to the configuration in which icons I are displayed radially around the last point of the unlock pattern performing the owner identification by the pattern drawn in one stroke, the unlock to the application start-up may be performed by a series of manipulations (without lifting a finger from a manipulation screen).

6. Example of Hardware Configuration

In the portable terminal 100, the portable terminal 200, the portable terminal 300, the portable terminal 400, and the portable terminal 500 according to the first to fifth embodiments of the present disclosure described above, the configurations appropriate to use may be selected depending on the level of technology when the present embodiments are implemented as described above. Herein, an example of a hardware configuration for realizing the functions of the portable terminal 100, the portable terminal 200, the portable terminal 300, the portable terminal 400, and the portable terminal 500 will be described with reference to FIG. 23. FIG. 23 is a block diagram illustrating an example of a hardware configuration of the portable terminals according to the first to fifth embodiments of the present disclosure. Also, the hardware configuration described herein is exemplary, and some elements may be omitted and added.

The portable terminal 100, the portable terminal 200, the portable terminal 300, the portable terminal 400, and the portable terminal 500, for example, include a GPS antenna 821, a GPS processing unit 823, a communication antenna 825, a communication processing unit 827, a geomagnetic sensor 829, an acceleration sensor 831, a gyro sensor 833, an atmospheric pressure sensor 835, an imaging unit 837, a central processing unit (CPU) 839, a read only memory (ROM) 841, a random access memory (RAM) 843, a manipulation unit 847, a display unit 849, a decoder 851, a speaker 853, an encoder 855, a microphone 857, and a storage unit 859.

The GPS antenna 821 is an example of an antenna that receives a signal from a positioning satellite. The GPS antenna 821 may receive GPS signals from a plurality of GPS satellites, and input the received GPS signals to the GPS processing unit 823.

The GPS processing unit 823 is an example of a calculation unit that calculates position information based on the signal received from the positioning satellite. The GPS processing unit 823 calculates current position information based on the plurality of GPS signals input from the GPS antenna 821, and outputs the calculated position information. Specifically, the GPS processing unit 823 calculates the positions of the respective GPS satellites from orbital data of the GPS satellites, and calculates each distance from the respective GPS satellites to the corresponding terminal device 100 based on a difference time between a transmission time and a reception time of the GPS signal. Then, a three-dimensional current position may be calculated based on the calculated positions of the respective GPS satellites and the distance from the respective GPS satellites to the corresponding terminal device 100. Also, the orbital data of the GPS satellites used herein may be included in, for example, the GPS signals. Alternatively, the orbital data of the GPS satellites may be obtained from an external server through the communication antenna 825.

The communication antenna 825 is an antenna that has a function of receiving a communication signal through, for example, a portable communication network or a wireless local area network (LAN) communication network. The communication antenna 825 may provide a received signal to the communication processing unit 827.

The communication processing unit 827 has a function of performing a variety of signal processing on the signal provided from the communication antenna 825. The communication processing unit 827 may provide the CPU 839 with a digital signal generated from a received analog signal.

The geomagnetic sensor 829 is a sensor that detects geomagnetism as a voltage value. The geomagnetic sensor 829 may be a triaxial geomagnetic sensor that detects geomagnetism of each of an X-axis direction, a Y-axis direction, and a Z-axis direction. The geomagnetic sensor 829 may provide the CPU 839 with the detected geomagnetic data.

The acceleration sensor 831 is a sensor that detects acceleration as a voltage value. The acceleration sensor 831 may be a triaxial acceleration sensor that detects each of acceleration along an X-axis direction, acceleration along a Y-axis direction, and acceleration along a Z-axis direction. The acceleration sensor 831 may provide the CPU 839 with the detected acceleration data.

The gyro sensor 833 is a type of measuring equipment that detects an angle and an angular velocity of an object. The gyro sensor 833 may be a triaxial gyro sensor that detects a changing velocity (angular velocity) of a rotational angle around an X axis, a Y axis, and a Z axis as a voltage value. The gyro sensor 833 may provide the CPU 839 with the detected angular velocity data.

The atmospheric pressure sensor 835 is a sensor that detects an ambient pressure as a voltage value. The atmospheric pressure sensor 835 may detect an atmospheric pressure at a predetermined sampling frequency and provide the CPU 839 with the detected atmospheric pressure data.

The imaging unit 837 has a function of capturing a still image or a moving image through a lens according to the control of the CPU 839. The imaging unit 837 may store the captured image in the storage unit 859.

The CPU 839 functions as an arithmetic processing device and a control device and controls the overall operations of the portable terminal 100, the portable terminal 200, the portable terminal 300, the portable terminal 400, or the portable terminal 500 according to various types of programs. Also, the CPU 839 may be a microprocessor. The CPU 839 may realize various functions according to various types of programs.

The ROM 841 may store programs and arithmetic parameters the CPU 839 uses. The RAM 843 may temporarily store programs used to execute the CPU 839, parameters changed appropriately for the execution thereof, or the like.

The manipulation unit 847 has a function of generating an input signal for a user to perform a desired manipulation. The manipulation unit 847 may be configured by, for example, an input unit, such as a touch sensor, a mouse, a keyboard, a button, a microphone, a switch and a lever, through which the user inputs information, and an input control circuit that generates an input signal based on the user's input and outputs the input signal to the CPU 839, and the like.

The display unit 849 is an example of an output device and may be a display device, such as a liquid crystal display (LCD) device, an organic light emitting diode (OLED) display device, or the like. The display unit 849 may display a screen to provide information to the user.

The decoder 851 has a function of performing decoding and analog conversion of input data according to the control of the CPU 839. The decoder 851, for example, performs decoding and analog conversion of audio data input through the communication antenna 825 and the communication processing unit 827, and outputs an audio signal to the speaker 853. The speaker 853 may output audio based on the audio signal provided from the decoder 851.

The encoder 855 has a function of performing digital conversion and encoding of input data according to the control of the CPU 839. The encoder 855 may perform digital conversion and encoding of an audio signal input from the microphone 857 and output audio data. The microphone 857 may collect audio and output the audio as an audio signal.

The storage unit 859 is a data storage device and may include a storage medium, a recording device configured to record data in the storage medium, a readout device configured to read data from the storage medium, an erasing device configured to erase data recorded in the storage medium, and the like. Herein, as the storage medium, for example, nonvolatile memories, such as a flash memory, a magnetoresistive random access memory (MRAM), a ferroelectric random access memory (FeRAM), a phase change random access memory (PRAM), and an electronically erasable and programmable read only memory (EEPROM), or magnetic recording media, such as a hard disk drive (HDD), may be used. The storage unit 859 may store information of combination of icons I to be displayed when each condition is satisfied. The condition displayed herein may be a condition using, for example, the above-described position information, behavior recognition result, case direction, or the like. Also, the storage unit 859 may store information of a set unlock pattern.

The preferred embodiments of the present disclosure have been described above with reference to the accompanying drawings, whilst the present disclosure is not limited to the above examples, of course. A person skilled in the art may find various alterations and modifications within the scope of the appended claims, and it should be understood that they will naturally come under the technical scope of the present disclosure.

For example, although the case in which the first manipulation is the press-and-hold manipulation or the unlock manipulation by the input of the unlock pattern has been described above in the embodiments, the present technology is not limited to these examples. For example, the present technology may also be applied to password input or other unlock manipulations. Also, in this case, icons may be displayed around the last point of the unlock manipulation. Moreover, in the case of a configuration that may detect a push manipulation, the first manipulation may be the push manipulation.

Also, in this specification, the steps described in the flow charts include processing performed in time series in the described order, and also include processing performed in parallel or individually, and not necessarily in time series. Also, it is obvious that, in some cases, the order of the steps processed in time series may also be appropriately changed.

Also, the following configurations also fall within the technical scope of the present disclosure.

According to one embodiment, an information processing apparatus includes a detector that detects an interaction position of a manipulation body on a display screen; and a controller that when the display screen is in a locked state, causes an arrangement of display items on the display screen to be based on a reference point, said reference point being a last contact position of a first manipulation of the manipulation body on the display screen, and when a second manipulation of the manipulation body indicating a direction of movement from the reference point is detected, starts up an application corresponding to a display item displayed in the direction of movement, said second manipulation occurring after said first manipulation.

According to one aspect of the embodiment, the controller arranges the display items radially around the reference point.

According to another aspect of the embodiment, the controller selects the display items based on a position of the reference point.

According to another aspect of the embodiment, the display screen is divided into a plurality of areas, and the control unit selects the display item displayed in the direction of movement based on which area the detected reference point is positioned.

According to another aspect of the embodiment, the display screen is at least one of a touch panel display and a proximity display.

According to another aspect of the embodiment, said display items are icons.

According to another aspect of the embodiment, the application is hosted on a remote computer.

According to another aspect of the embodiment, the apparatus further includes a behavior recognition unit configured to recognize a behavior of a user, wherein the controller selects the display item displayed in the direction of movement based on a behavior of the user recognized by the behavior recognition unit.

According to another aspect of the embodiment, when the direction of movement of the second manipulation is between respective display items, the display screen displays a home screen.

According to another aspect of the embodiment, the first manipulation is to authenticate a device owner, and the second manipulation is to start up the application.

According to another aspect of the embodiment, the apparatus further includes a case; and a case direction detection unit configured to detect a direction of the case, wherein the controller displays different sets of display items depending on the direction of the case.

According to another aspect of the embodiment, the first manipulation is a press-and-hold manipulation that includes pressing and holding at a point of the display screen for a predetermined period of time.

According to a method embodiment, the method includes detecting an interaction position of a first manipulation on a display screen when in a locked state;

displaying on the display screen an arrangement of display items based on a reference point indicating a last contact position of a manipulation body when the first manipulation is completed;

detecting a second manipulation indicating a direction of movement from the reference point; and starting up an application corresponding to a display item displayed in the direction of movement, said second manipulation occurring after said first manipulation.

According to one aspect of the method, the displaying includes arranging the arrangement of display items radially around the reference point.

According to another aspect of the embodiment, the displaying includes displaying the arrangement of display items based on a position of the reference point.

According to another aspect of the embodiment, the display screen is divided into a plurality of areas, and the displaying includes displaying the arrangement of display items based on which area the detected reference point is positioned.

According to another aspect of the embodiment, the detecting an interaction position includes detecting the interaction position on one of a touch panel display and a proximity display.

According to another aspect of the embodiment, the displaying includes displaying the arrangement of display items as an arrangement of icons.

According to another aspect of the embodiment, the starting up includes starting up the application on a remote computer.

According to a non-transitory computer readable storage medium embodiment, the storage medium has instructions stored therein that when executed by a processor perform an information processing method, the method includes detecting an interaction position of a first manipulation on a display screen when in a locked state;

displaying on the display screen an arrangement of display items based on a reference point indicating a last contact position of a manipulation body when the first manipulation is completed;

detecting a second manipulation indicating a direction of movement from the reference point; and starting up an application corresponding to a display item displayed in the direction of movement, said second manipulation occurring after said first manipulation.

REFERENCE SIGNS LIST

100 Portable terminal
103 Display unit
105 Touch sensor
107 Control unit
200 Portable terminal
207 Control unit
209 Position information acquisition unit
300 Portable terminal
307 Control unit
311 Behavior recognition unit
400 Portable terminal
407 Control unit
414 Case direction detection unit
500 Portable terminal

The invention claimed is:

1. An information processing apparatus comprising:

a display screen;

a touch sensor configured to detect an interaction position of a manipulation body on the display screen, wherein the display screen includes a plurality of pre-defined different areas including at least a first area and a second area, wherein the first area is an area for starting up a first application, and the second area is an area for starting up a second application; and circuitry configured to:

control contents of the display screen based on the interaction position of the manipulation body input from the touch sensor, in response to a first manipulation of the manipulation body in the first area, begin to display a first set of icons for starting up the first application on the display screen in a locked state, in response to a second manipulation of the manipulation body in the second area, begin to display a second set of icons for starting up the second application on the display screen in a locked state, display a number amount of new information regarding an application that corresponds to a respective icon among the second set of icons displayed on the display screen, wherein the second set of icons is different from the first set of icons, wherein the locked state is a state where user manipulations other than a predetermined manipulation are invalidated,
wherein the first set of icons and the second set of icons are arranged in a vertical row,
wherein the first set of icons are a set of icons pre-selected before shipment of the information processing apparatus, and
wherein the user creates the second set of icons to be displayed by selecting icons one by one,
wherein the circuitry is configured to arrange the icons radially around a last contact position of the first manipulation on the display screen, and
wherein the circuitry is configured to execute a process related to the identified icon included in the icons in a case that a third manipulation is detected after said first manipulation within a predetermined period of time.

2. The information processing apparatus according to claim 1, wherein:
the display screen is at least one of a touch panel display and a proximity display.

3. The information processing apparatus according to claim 1, wherein the circuitry is configured to:
identify at least one of the icons based on a recognition result of a behavior of a user.

4. The information processing apparatus according to claim 1, wherein:
when the direction of movement of the second manipulation is between respective icons, the display screen displays a home screen.

5. The information processing apparatus according to claim 1, wherein
the first manipulation is to authenticate a device owner, and
the second manipulation is to start up a process.

6. The information processing apparatus according to claim 1, further comprising:
a case, wherein
the circuitry is configured to
detect a direction of the case, and
generate a signal for displaying different sets of icons depending on the direction of the case.

7. The information processing apparatus according to claim 1, wherein
the first manipulation is a press-and-hold manipulation that includes pressing and holding at a point of the display screen for a predetermined period of time.

8. An information processing method comprising:
detecting an interaction position of a manipulation body on a display screen, wherein the display screen includes a plurality of pre-defined different areas including at least a first area and a second area, wherein the first area is an area for starting up a first application, and the second area is an area for starting up a second application;
controlling contents of the display screen based on the interaction position of the manipulation body input from the touch sensor;
in response to a first manipulation of the manipulation body in the first area, begin displaying a first set of icons for starting up the first application on the display screen in a locked state; and
in response to a second manipulation of the manipulation body in the second area, begin displaying a second set of icons for starting up the second application on the display screen in a locked state,
wherein the second set of icons is different from the first set of icons,
wherein the locked state is a state where user manipulations other than a predetermined manipulation are invalidated,
wherein the first set of icons and the second set of icons are arranged in a vertical row,
wherein the first set of icons are a set of icons pre-selected before shipment of an information processing apparatus,
wherein the user creates the second set of icons to be displayed by selecting icons one by one,
arranging the icons radially around a last contact position of the first manipulation on the display screen, and
executing a process related to the identified icon included in the icons in a case that a third manipulation is detected after said first manipulation within a predetermined period of time.

9. The information processing method according to claim 8, wherein:
the detecting the interaction position includes detecting the interaction position on one of a touch panel display and a proximity display.

10. The information processing method according to claim 8, wherein:
the displaying includes displaying the arrangement of icons as an arrangement of icons.

11. A non-transitory computer readable storage medium having instructions stored therein that when executed by a processor perform an information processing method, the method comprising:
detecting an interaction position of a manipulation body on a display screen, wherein the display screen includes a plurality of pre-defined different areas including at least a first area and a second area, wherein the first area is an area for starting up a first application, and the second area is an area for starting up a second application;
controlling contents of the display screen based on the interaction position of the manipulation body input from the touch sensor;
in response to a first manipulation of the manipulation body in the first area, begin displaying a first set of icons for starting up the first application on the display screen in a locked state; and
in response to a second manipulation of the manipulation body in the second area, begin displaying a second set of icons for starting up the second application on the display screen in a locked state,
wherein the second set of icons is different from the first set of icons,
wherein the locked state is a state where user manipulations other than a predetermined manipulation are invalidated,
wherein the first set of icons and the second set of icons are arranged in a vertical row,
wherein the first set of icons are a set of icons pre-selected before shipment of an information processing apparatus, and
wherein the user creates the second set of icons to be displayed by selecting icons one by one,
arranging the icons radially around a last contact position of the first manipulation on the display screen, and
executing a process related to the identified icon included in the icons in a case that a third manipulation is detected after said first manipulation within a predetermined period of time.

12. The information processing apparatus according to claim 1, wherein the circuitry is configured to identify at least one of the icons based on position information.

13. The information processing apparatus according to claim 1, wherein the circuitry is configured to identify at least one of the icons based on time information.

14. The information processing apparatus according to claim 1, wherein the circuitry is configured to identify at least one of the icons based on information on a user's schedule.

15. The information processing apparatus according to claim 1, wherein the circuitry is configured to identify at least one of the icons based on a detection value of a gyro sensor or an acceleration sensor.

16. The information processing apparatus according to claim 1, wherein the circuitry is configured to display the first set of icons and the second set of icons at arbitrary positions on the display screen based according to a detected position on the display screen of the first manipulation.

17. The information processing apparatus according to claim 1, wherein the first set of icons are preselected by a user.

18. The information processing apparatus according to claim 1, wherein the circuitry is configured to determine whether or not the second manipulation is detected within a predetermined period of time, and the process related to the icon is executed only when the second manipulation is determined to be detected within the predetermined period of time.

19. The information processing apparatus according to claim 1, wherein the circuitry is configured to start up a home application in a case no icon is specified by the second manipulation.

20. The information processing apparatus according to claim 3, wherein the circuitry is configured to identify at least one of the icons based on a recognition result of jogging by the user.

21. The information processing apparatus according to claim 1, wherein, in the case the second manipulation is performed in the second area of the display screen, the circuitry causes a display of the second set of icons radially around the position in the display screen of the second manipulation.

22. The information processing apparatus according to claim 1, wherein the display screen has a rectangular shape.

23. The information processing apparatus according to claim 1, wherein the circuitry is configured to end an unlock process in a case that said third manipulation is not detected within the predetermined period of time.

24. The information processing apparatus according to claim 1, wherein the circuitry is configured to execute a process related to the identified icon included in the icons without displaying a home screen in a case that said third manipulation is detected within the predetermined period of time.

25. The information processing apparatus according to claim 1, wherein the circuitry is configured to display a number amount of new information regarding an application that corresponds to a respective icon among the second set of icons displayed on the display screen.

* * * * *